Aug. 1, 1944.   G. T. SOUTHGATE   2,354,711
ELECTRIC SYSTEM AND DEVICE THEREFOR
Filed April 16, 1940   9 Sheets-Sheet 1

Inventor
GEORGE T. SOUTHGATE
By
Bartlett Eyre Keel & Seymour
Attorneys

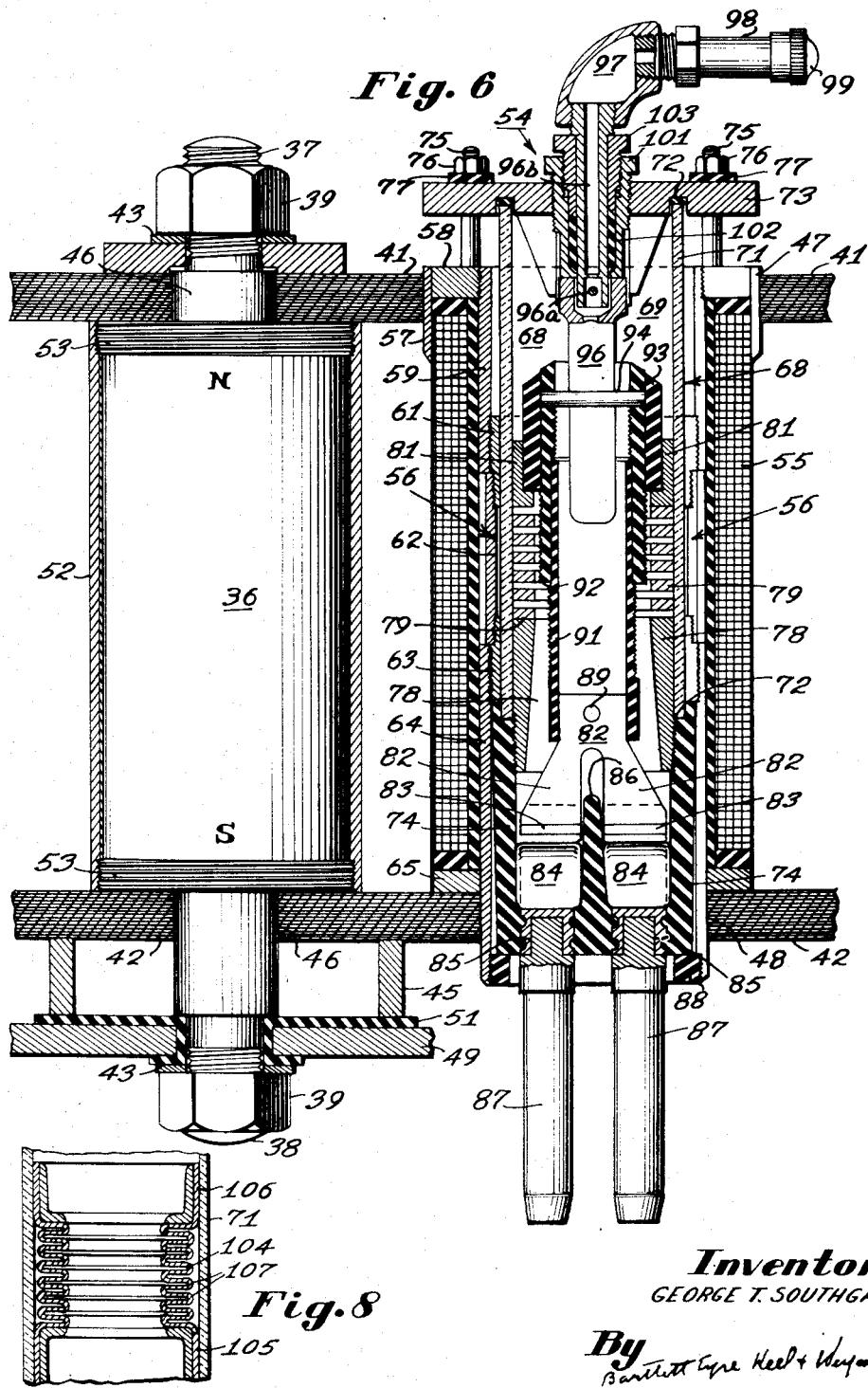

Aug. 1, 1944.   G. T. SOUTHGATE   2,354,711
ELECTRIC SYSTEM AND DEVICE THEREFOR
Filed April 16, 1940   9 Sheets-Sheet 3
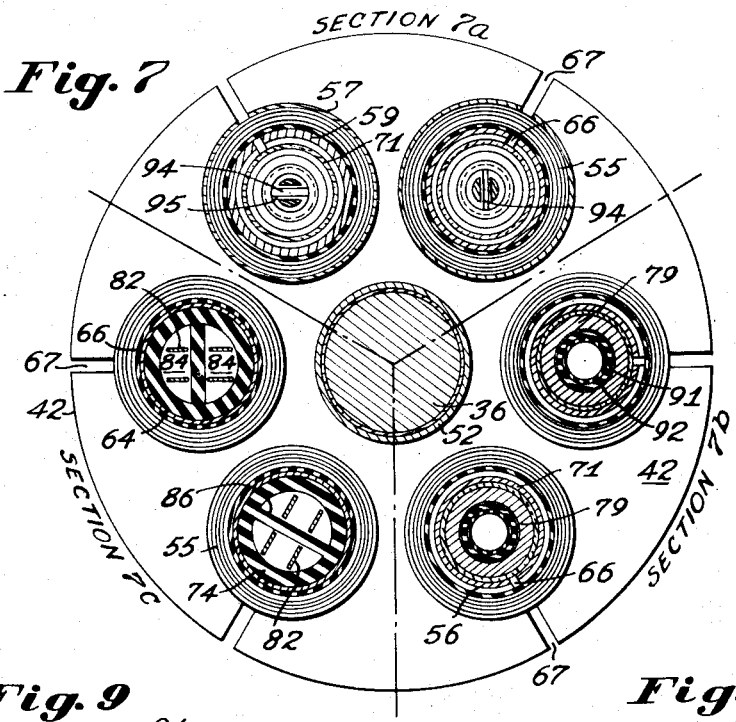
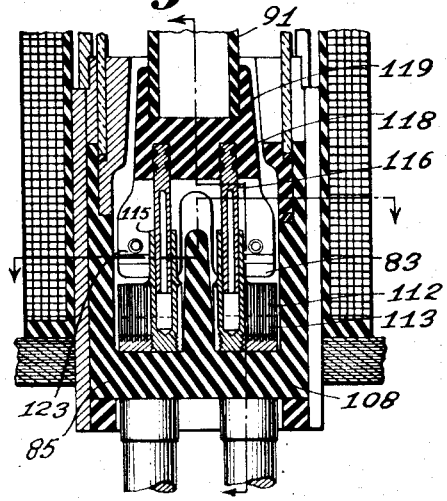
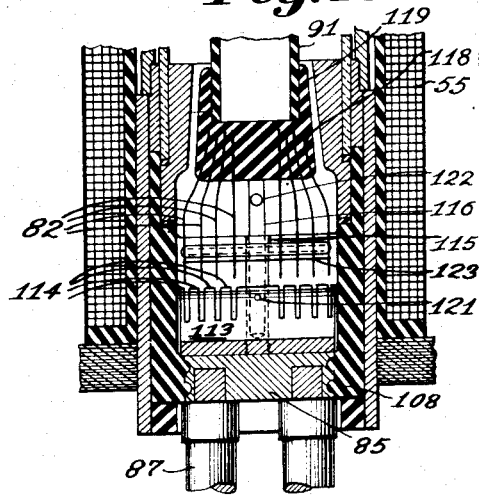
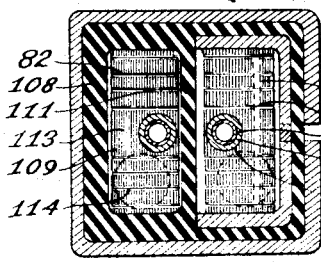
*Inventor*
GEORGE T. SOUTHGATE
*By*
Bartlett, Eyre, Neel & Weymouth
*Attorneys*

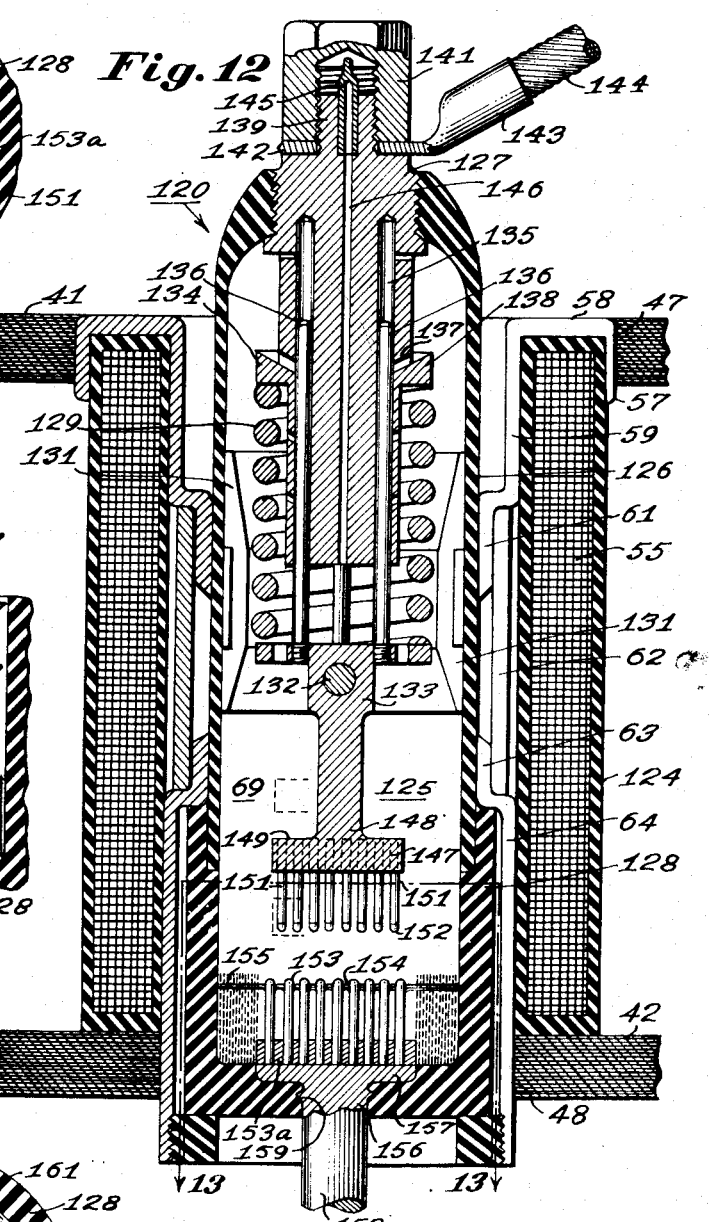

Aug. 1, 1944. G. T. SOUTHGATE 2,354,711
ELECTRIC SYSTEM AND DEVICE THEREFOR
Filed April 16, 1940 9 Sheets-Sheet 5

Inventor
GEORGE T. SOUTHGATE
By Bartlett Eyre Keel & Weymouth
Attorneys

Aug. 1, 1944. G. T. SOUTHGATE 2,354,711
ELECTRIC SYSTEM AND DEVICE THEREFOR
Filed April 16, 1940 9 Sheets-Sheet 6
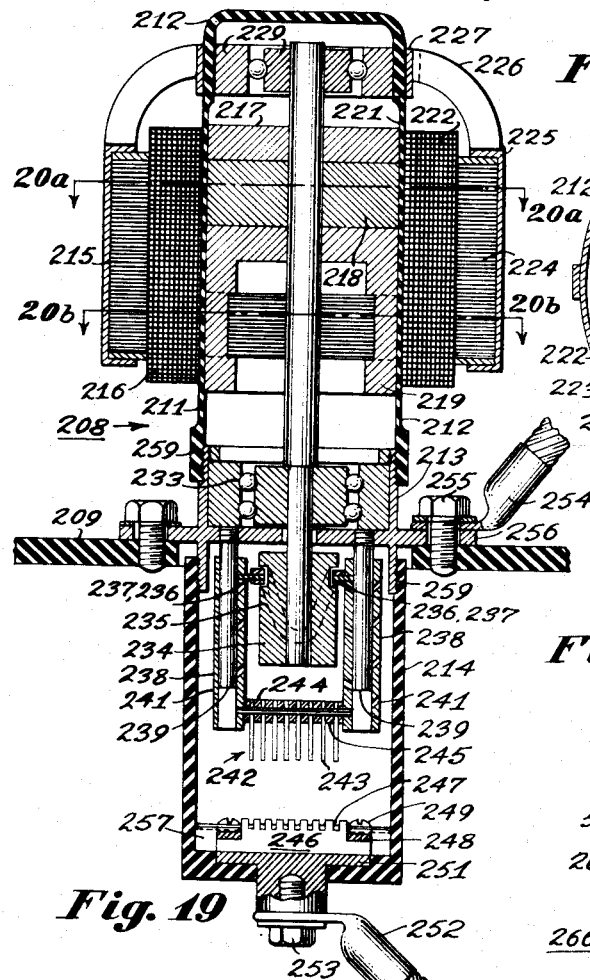
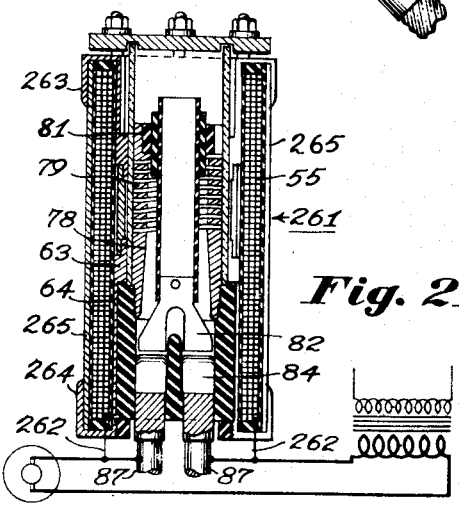
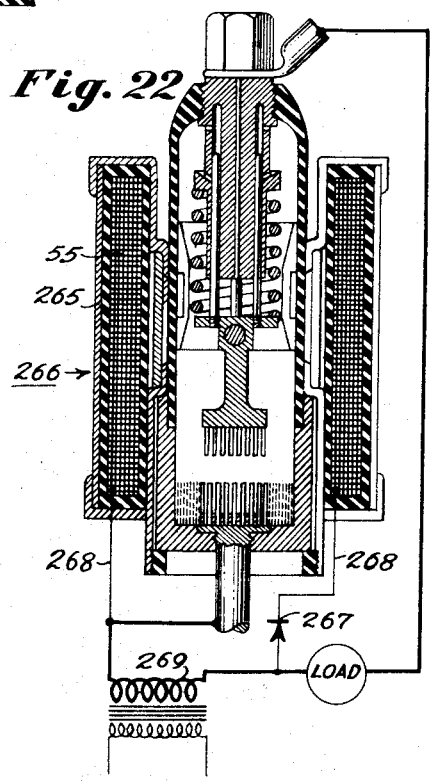
Inventor
GEORGE T. SOUTHGATE
By Bartlett Eyre Keel
Weymouth
Attorneys

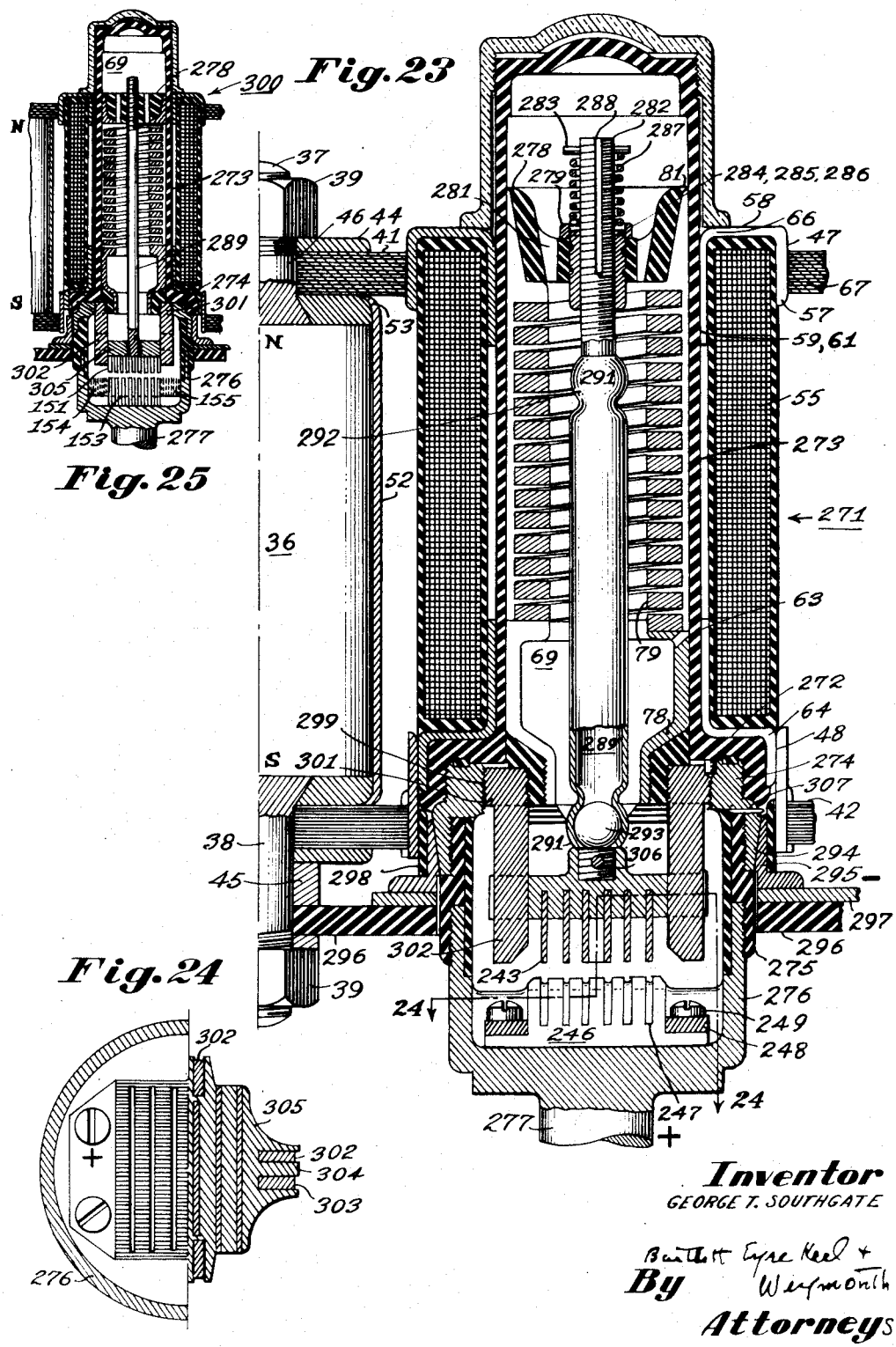

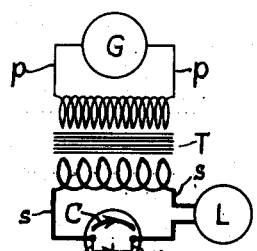
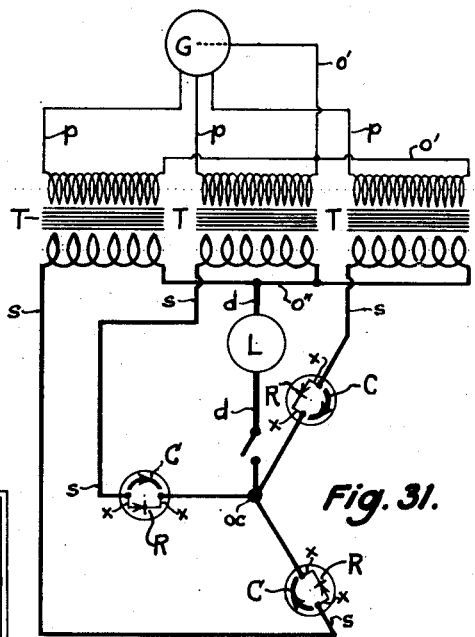
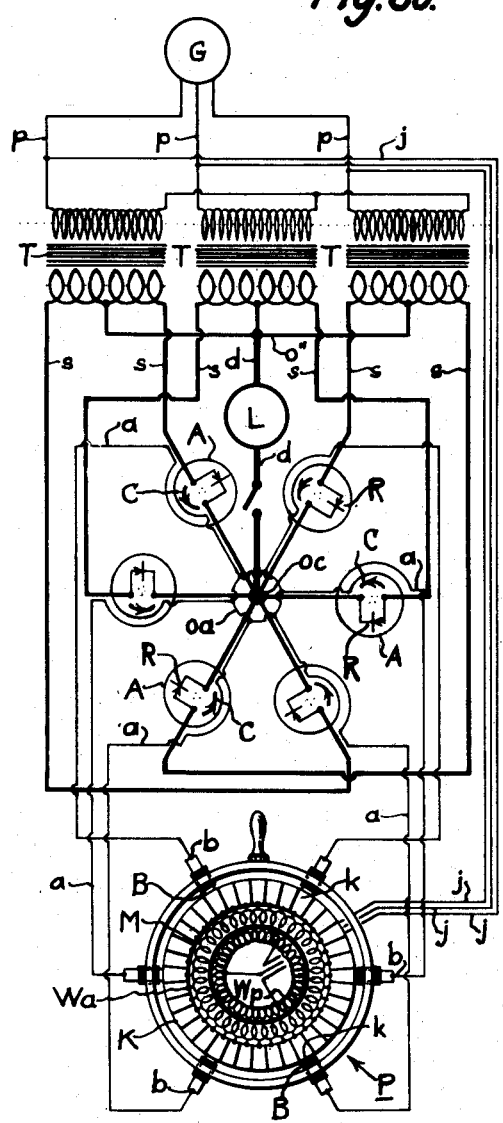
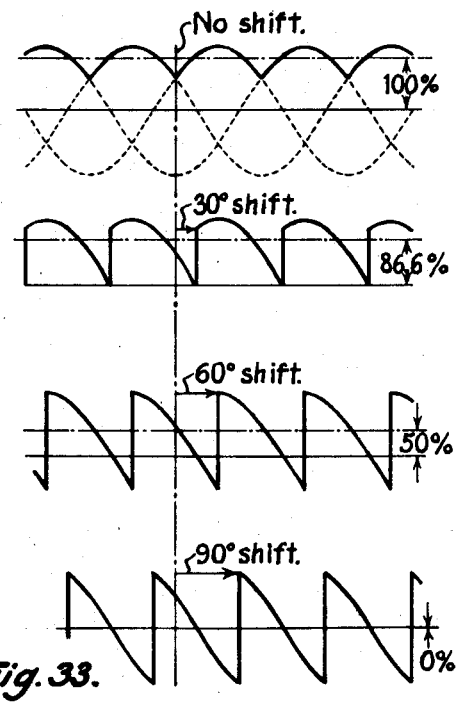

Patented Aug. 1, 1944

2,354,711

UNITED STATES PATENT OFFICE 2,354,711

ELECTRIC SYSTEM AND DEVICE THEREFOR

George T. Southgate, Forest Hills, N. Y.

Application April 16, 1940, Serial No. 329,885

31 Claims. (Cl. 175—364)

This invention pertains to electric systems wherein electromotive induction is combined with commutative or simple rectification, and to contactive means therefor.

In United States Letters Patent 1,967,135, issued July 17, 1934, on my invention entitled "Commutating method and device," in United States Letters Patent 2,165,309, issued July 11, 1939, on my invention entitled "Electric power conversion," and in my United States Letters Patent 2,254,247, issued September 2, 1941, on my invention entitled "Electric conversion," I have illustrated certain electric systems together with forms of vibratory apparatus devised to perform the contacting required in those inventions. The present invention advantageously collaborates with and extends this class of operations. Certain of the contacting means herein are also well adapted to other periodic or aperiodic connecting as in selective relays.

One object of the invention is the provision of conversion systems wherein electromotive means are combined and coact with improved vibratory contactors comprising sealed cells. Thereby the rectifying and commutative functions are performed with greater satisfaction than by the prior forms of my contactive apparatus, and the flexibility of exploitation of the systems is facilitated. The electromotive means may include transformers, generators or other apparatus in which electromotive force is induced.

Another object of the present invention is the provision of a conversion method conducting currents from a junction, through polyphase-connected transformers and vibratorily actuated, rectifying contactors to and through a direct-current power circuit; also the provision of a method of vibratory commutation with voltage adjustment through phase-shifting of the vibratory actuation.

The improved contacting means of this invention are characterized in part by contact members having surfaces mobile or yieldable as to form or contour, hence adapted to the making of full faced contact rather than touching at a few local spots. Specifically, these improved elements differ from contact members whose working faces are relatively rigid and can give only part-faced contact even though mounted on flexible supports. The surface mobility of the improved contactors is imparted by bodies of liquid metal such as mercury, or by fluidizing the faces of solid metal parts through wetting with mercury, or by separately and resiliently yieldable, finely subdivided solid metal elements at the surface.

A further important feature is enclosure of the driving elements with the electrically contactive parts. The driving elements may be actuated by changes of flux in magnetic circuits in which these elements are included. The enclosing cells may contain protective gases sealed off at any suitable pressure. Herein by "sealed cell" is meant one either permanently closed off or held at a desired pressure as by pumping.

The contacting means of my invention having mobile or yieldable surfaces differs from conventional mercury contactors, among other things, in that herein heavy currents may be led via substantial total cross-sections of solid good conductors such as copper or tungsten, through intervening films or broad and short paths of mercury, rather than through columns of that high-resistance liquid metal.

An important aspect of the invention is that the magnetically actuated elements may be polarized with unidirectional magnetism; whereby the movements of the parts may be made selective with respect to the actuative fluxes, and the amount of the displacement enhanced.

An additional distinction is the construction of coacting members into compact and interchangeable contactor units, ready for insertion in an electric system. The electric system may be served by one of these units having appropriate contacting elements, or by plural contactors, connected and collaborating in parallel, in series or in other arrangements.

Compactness and lightness are among the primary objects sought in this invention, especially in the service of rectification, through exploitation of the superior power capacity of magnetic switches as compared with asymmetrically resistive circuit controllers such as mercury-vapor, electronic or junction rectifiers, hereinafter called asymmetric resistances.

Durability of the working parts in my compact contactors is another object, particularly for the continuous task of conversion.

Efficiency of energy transfer through metallic contacting in my apparatus is an important object of improvement over the relatively high-loss conduction in asymmetric resistances.

Design flexibility within its principles, for large or small currents or voltages, for standard frequencies in current conversion, and for various kinds of relay actions, is an object of improvement as compared with the economic limitations of asymmetric resistances, rotary commutators, etc.

Ampleness of ampere capacity not only in the contact elements but also in their connections to the external circuits, and relief of springs or other elastic elements from major electric conduction to the contacts, are important objects herein.

Coordination of the stated objects serves a major object, that of providing a contactor having the advantages of enclosure, of ampleness of the contacts, and of such reliability and permanence of their coaction as to obviate the need of access for reconditioning.

I have discovered that relative motion within a cell of certain improved elements gives excellent facility of actuation from without the cell by electromagnetic means. Where employed in vibratory conversion, several forms of the contactors are designed preferably with elastic elements so coordinated with the inertia of the moving parts as to give a resultant frequency of their natural vibration tuned in definite relation to the frequency of the applied actuative magnetic forces.

Several but not all possible embodiments of my invention are shown in the accompanying drawings. Similar numbers refer to similar parts throughout the several views.

Figure 17:
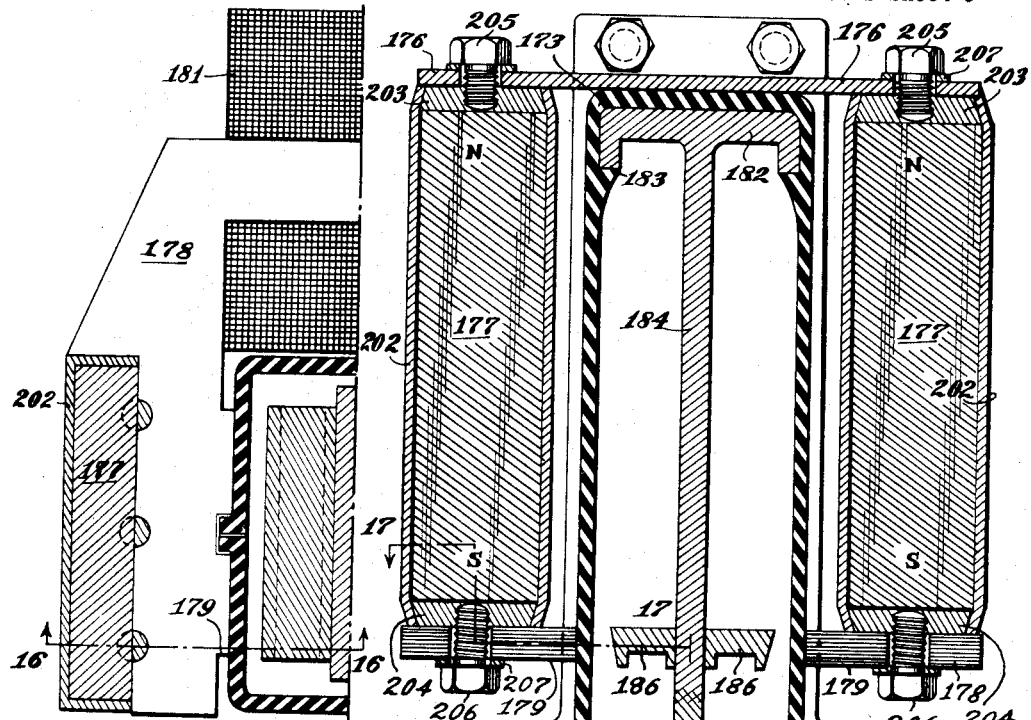
Figure 16:
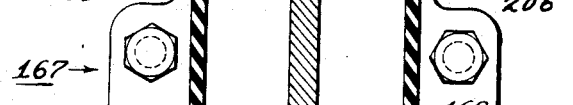
Figure 18:
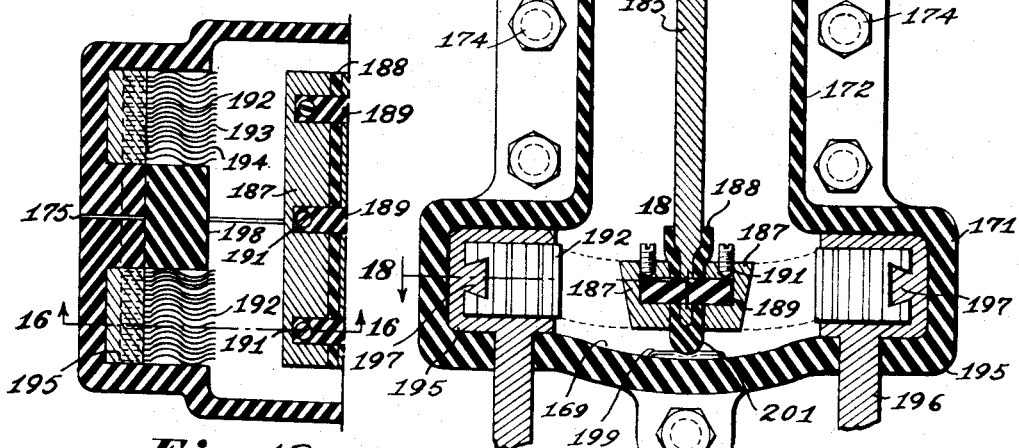
Figure 26:
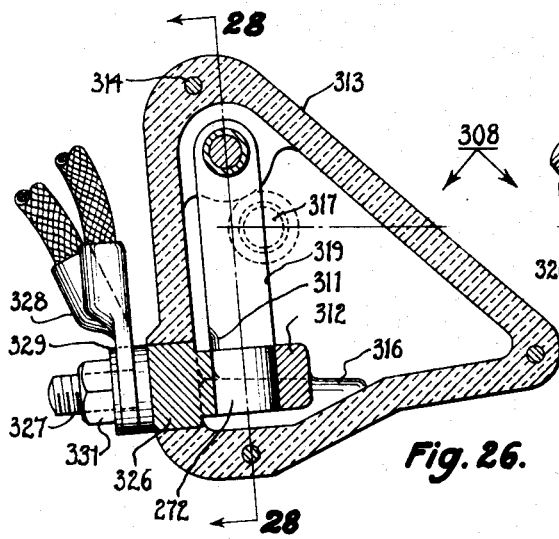
Figure 27:
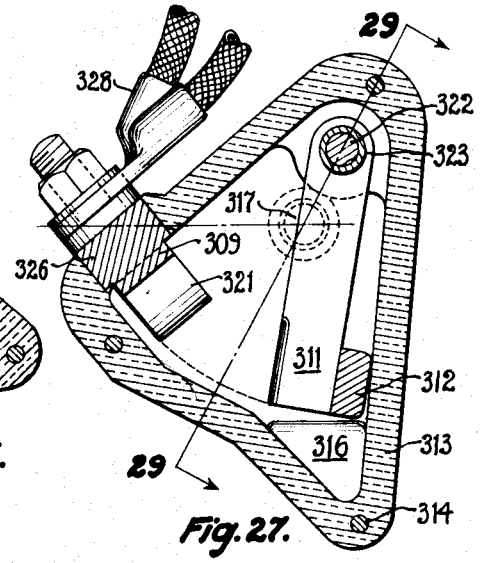
Figure 28:
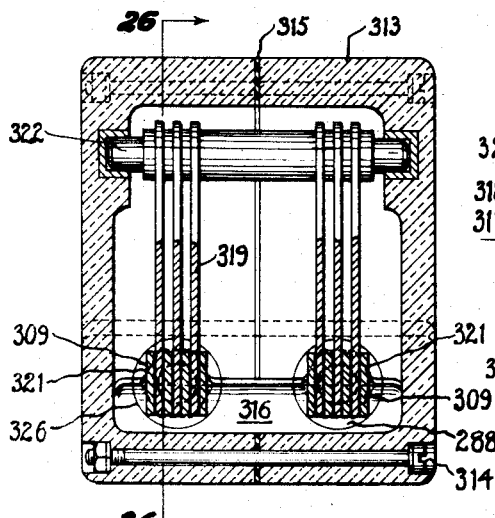

Fig. 6, a vertical midsection, shows one cell of another form of my contactor, together with the relevant portions of a typical magnetic mounting employed in its utilization;

Fig. 7 is a plan view, comprising sectons at three levels, 7a, 7b, and 7c marked in Fig. 6, showing the magnetic arrangements in full polyphase assembly such as is illustrated for one phase only in Fig. 6;

Fig. 8 is a vertical midsection of a form of combined elastic and actuation elements, comprising a ferromagnetic multiple-bellows tube that may support such movable contacts as those in Fig. 6;

Figs. 9, 10 and 11, respectively two vertical sections and a horizontal section, depict a rectangular form of contactor base and its contained elements as a modification of the circular form in Fig. 6. Fig. 9 is a vertical midsection; Fig. 10 is a vertical section in the broken plane 10—10 of Fig. 9; and Fig. 11 is a horizontal section in the broken plane 11—11 of Fig. 9;

Fig. 12, a vertical midsection, shows a form of my improved contactor wherein the conduction of the power current is lengthwise of the cell as a whole rather than (as in Fig. 6) in a loop of an inverted U at the base;

Fig. 13 is a horizontal section in the plane 13—13 of Fig. 12, showing details of the contacting and pool-stilling elements;

Fig. 14 is a vertical midsection of a form of contacting elements modified from those in Figs. 12 and 13;

Fig. 15 is a horizontal section of the pin-type moving contact elements of Fig. 12 combined with a pool-stilling means differing somewhat from the means shown in Figs. 12 and 13;

Figs. 16, 17 and 18, respectively a vertical section 16—16, the horizontal section in the broken upper plane 17 marked in Fig. 16, and the horizontal section in the lower plane 18, also indicated in Fig. 16, show a form of my contactor combining with heavy ampere capacity the double-throw action of the form in Figs. 1 to 5 inclusive;

Figs. 19 and 20, respectively a vertical midsection and a plan section in the two planes marked 20a—20a and 20b—20b in Fig. 19, show a form of my contactor in which the electromagnetic action is rotary and is converted into reciprocative motion delivered to the moving contacts;

Figs. 21 and 22 are diagrams of electric (as distinguished from magnetic) means of polarizing the actuation of the contactors;

Figs. 23 and 24, respectively a vertical midsection and a horizontal section in the broken plane 24 in Fig. 23, show a form of the contactor derived by combining the actuative elements of Fig. 6 with the mid-supporting parts and the contactive elements of Fig. 19;

Fig. 25, a vertical midsection, illustrates a favored form of my contactor wherein the design of Figs. 23 and 24 is altered only by substituting for the blade-and-slot contacts the pin-type contact elements introduced in Figs. 12 and 13;

Figs. 26, 27, 28 and 29 are views of a form of contactor actuated by gravity and suitable for relatively heavy currents; the two upper views being midsections in the same direction but shown at different angles of tilt; Fig. 28 being a section in the plane 28—28 of Fig. 26; and Fig. 29 being a section in the plane 29—29 of Fig. 27;

Fig. 30 is a diagram of a method of electric conversion employing vibratory contacting with auxiliary rectification in parallel therewith;

Fig. 31 is a diagram illustrating a method of polyphase conversion employing vibratory contacting;

Fig. 32 is a diagram of a method of polyphase conversion employing vibratory contacting, modified to permit adjustment of the output voltage; and Fig. 33 is a diagram of four sets of sine waves used in explaining the actions in the method corresponding to Fig. 32.

I will first describe several forms of the contactors comprised in the invention, and thereafter will further set forth their relation to my improved electric conversion.

Referring to Figs. 1, 2, 3 and 4, the numeral 10 designates one form of my improved contactor. In it the small pools 11, 11 of liquid metal are contained in four contact cups 12, 12. The liquid metal is generally and preferably mercury, and the containing cup may be made of a metal not freely soluble in mercury, such as copper or molybdenum. The cups 12 are extended upward for about 180° of their obliquely outward peripheries into shields 13, 13, to protect the adjacent electric insulation from radiation due to any sparking.

Figure 1:
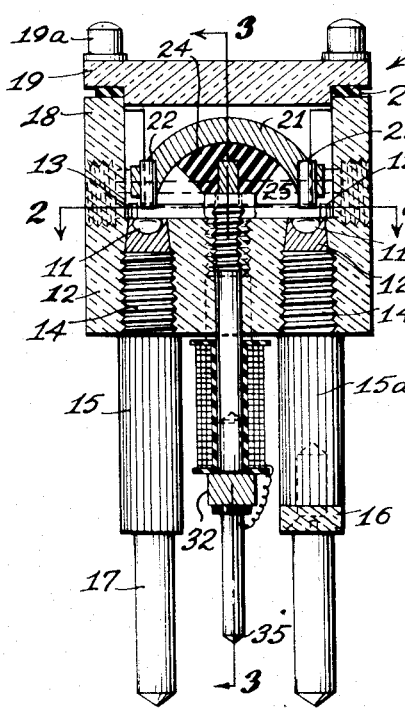
Fig. 1 is a unit or cell of one form of my contactor, in vertical midsection indicated by the plane 1—1 of Fig. 2.

The cups 12 are fastened to the top ends of lead-in studs 14, 14, which have threaded upper ends for holding the cups and studs with the assistance of cement, tight against gas or liquid seepage. The midportions of studs 14 are provided with fluted enlargements 15, 15a, to serve as radiators of heat carried down from their upper or working ends. In Fig. 1 it is shown that radiators 15a are shorter than 15, by an amount to accommodate a horizontal copper bar 16, which electrically unites the two contact cups above it at the same potential. The underside of this bar carries a connection prong 17a, while the two full-length radiators 15 are extended into prongs 17, 17. The three prongs form a set for connecting the contactor in its typical function as a three-way vibratory switch, such as may be employed in commutating one of the tap-points of a stationary (otherwise ordinary) closed-winding armature. All three prongs are adapted to be inserted into connection sockets (not shown) similarly to the plugging of a radio tube into its receptacle.

The threaded upper ends of the connection studs 14 are screwed into cell body 18 of insulating material such as glass or a resinoid, here shown transparent for visibility of the parts. This cell body is closed at the top with a cover 19 of preferably transparent material such as glass or clear resinoid, clamped by the screws 19a—19a and sealed by the impervious gasket 20.

The main or power electric circuits are operatively completed between the mercury cups by metal bridges 21, 21 and contact pins 22, 22. For lightness the bridges may be made of aluminum alloy; and the contact pins 22 may be made of spark-resisting refractory metal such as tungsten or molybdenum. In vibratory contacting, the dipping of these pins tends to cause splashing; and this may be minimized by pluralizing the pins in electric parallel on each arm and reducing the size of the pins.

Figure 5:
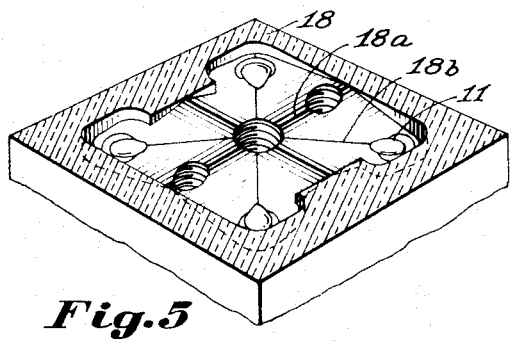
Fig. 5 is an isometric projection of a detailed improvement in the floor of this cell.

Such splashing of mercury as does occur may be compensated by providing means for the immediate and substantially uniform return of the liquid to the four pools. In Fig. 5 there is illustrated a modification of the floor of the insulating cell body 18, comprising the formation of slopes having ridges 18a and 18b and low portions at the four corners level with the tops of the cups 11. Under normal conditions the splashed droplets are returned at random to the four sloping sections and hence maintain an equilibrium; but if one pool starts with or receives more mercury than the others, its higher level causes its loss by splashing to be greater than its share of the returns, and thus restores the equilibrium. This action requires such symmetry of dimensions as is seen provided, and reasonable levelling of the cell.

Figure 2:
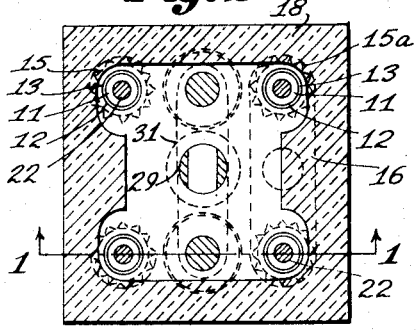
Fig. 2 is a plan section in the plane 2—2 of Fig. 1, drawn to show more clearly certain elements in the contacting arrangement.
Figure 4:
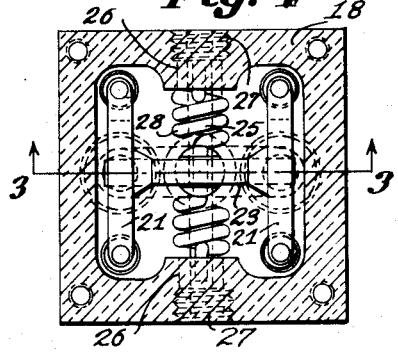
Fig. 4 is a plan section in the plane 4—4 marked in Fig. 3, to complete the showing of the actuative parts of this cell.
Figure 3:
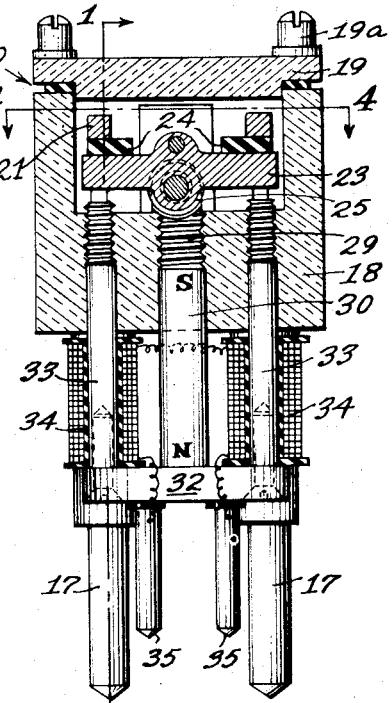
Fig. 3 is a vertical midsection at right angles to the plane of Fig. 1, as shown by the plane 3—3 in Figs. 1 and 4.

In Figs. 1, 3 and 4, the bridges 21 are actuated by the rocker 23 of steel, preferably laminated, through the insulating brackets 24, 24 of a resinoid or the like, strongly fastened between these parts. The rocker 23 is mounted upon a steel shaft 25, in turn journalled in bushings 26, 26 of preferably graphite-impregnated, self-lubricative metal alloy. These bushings may be made accessible by the gas-tight taper threaded plugs 27, 27 of metal or resinoid.

The rocker 23, by means of the spring 28, is given a normal tendency to return to the neutral position as shown. When the contactor is employed in vibratory switching, this spring should be of such stiffness that in interaction with the inertia of the moving system it will cause the natural frequency of the system to be suitably close to that of the electric circuit undergoing the switching, as in rectification. For that utilization, further explanation is given of desirable tuning of frequency of the moving parts, hereinafter with reference to the modification shown in Fig. 6. The rocker and its shaft are positioned close to but not in rubbing contact with a steel central clevis 29, fastened down to the cell body 18 as by the threading shown.

The clevis 29 transmits polarizing flux from without the cell to the rocker 23, i. e., from the magnet 30, preferably of one of the new magnet steels containing aluminum, nickel and sometimes cobalt. Instead of or auxiliary to the use of permanent-magnet alloy for the member 30 it may be excited from a coil 31 as shown lightly dotted in Figs. 2 and 4 carrying direct current. This polarizing coil may cooperate in imparting large actuative force and amplitude to the rocker 23. The upper end of magnet 30 is held pressed against the threaded lower portion of clevis 29, by means of a cross-bar 32 of soft steel, in turn fastened to the variable-flux cores 33, 33 of soft steel. In vibratory use of the contactor, the cross-bar 32 and the unthreaded portions of cores 33 may be laminated as is familiar in the art, inasmuch as they are then excited with alternating magnetomotive force from the actuative coils 34, 34. If the actuation is done with direct current, as in relays, these steel parts need not be laminated. The current for the coils is carried thereto by means of the auxiliary connection posts 35, 35. In any operation, whether vibratory or occasional switching, the timing or phase of the actuative currents in these coils must bear a proper relation to the timing required of the power currents conducted through the main contacts comprising the mercury pools.

Because of its series double breaking of each circuit, and the use of mercury for electrodes, this contactor is suitable for relatively high-voltage operation. Its efficiency therefor may be enhanced by employing as the gas within the cell a chemically inert and spark-quenching one such as helium or hydrogen, and further by using this gas at relatively high pressure, e. g. ten atmospheres.

The operation of the foregoing form of my improved contactor is fairly obvious from the description. When actuative current passes through the coils 34, 34, in the direction such that its magnetomotive force is additive to that of the polarizing magnets in say the left-hand core 33 of Figs. 3 and 4, this same current produces simultaneously in the right-hand core an equal magnetomotive force that is subtractive from the polarization therein. In consequence, the attraction from the rocker 23 to the left-hand core is increased and that to the right-hand core decreased; so that the rocker moves counterclockwise against the stiffness of the spring 28, and the left-hand bridge 21 and pins 22 are caused to span connection between the corresponding mercury pools 11. A reversal of the current in the coils 34 causes reversal of this motion of the parts, whether the current in the coils be an isolated pulse as in occasional switching or steadily periodic as in commutation or rectification.

The general modification of my improved contactor shown in Figs. 6 and 7 is a preferred form where moderately heavy currents are to be carried, especially in the service of vibratory rectification. For example, in Fig. 6 of the full-size patent drawings, the apparatus is shown of actual size for a rating of 100 amperes rectified output per contactor, having been operated at considerably above that current. As in a system of connection commonly employed with vapor rectifiers and their transformers, a six-phase grouping of these elements gives six times the current output of one, with the unique distinction that herein the rectified current is conducted in low-resistance paths of solid and liquid metals rather than in the power-wasteful medium of the mercury arc.

Magnetic benefits from polyphase cooperation in the actuation of the improved contactors are exemplified in Figs. 6 and 7, where one polarizing system serves six contactors actuated in six phases or steps of timing. One consequence of this cooperation is that permanent magnets may be employed for polarization without risk of being demagnetized; because the alternating magnetomotive forces of actuation at all times add up to zero from end to end of the permanent magnets.

In these figures, a central permanent magnet 36 (also marked N—S) is connected by upper bolt 37 and lower bolt 38 and clamped by nuts 39, 39, to the upper polarizing flange 41 and lower polarizing flange 42. The bolts 37 and 38, of mild steel, are provided with wide heads having flat faces that adhere directly to the flat ends of the magnet 36, and with the shanks and threads as shown to fit the nuts. The nuts may be of a self-locking variety, and may be seated on ordinary steel washers 43, 43. A spread washer 44 is provided above the top polarizing flange, and a metal ring 45 beneath the lower one, to distribute over a wide area the clamping pressure thereon.

These polarizing flanges 41 and 42 may be of laminated transformer steel, assembled from sheets punched with the central holes 46, 46 and outer holes 47 and 48. The holes 47 in the upper polarizing flanges 41 are larger than the holes 48 in the lower flanges 42, for reasons that will be evident below. The assembly of the magnet 36, its fastenings and the polarizing flanges is centrally supported on the structural plate 49, and insulated therefrom by the sheet insulation 51. The magnet 36 is encased in a copper jacket 52, which serves the double purpose of shielding the magnet from stray alternating fluxes with their demagnetizing effect, and of structurally binding together the terminal bolts 37 and 38 by means of the threads 53, 53, or by an equivalent such as forming over the ends of the jacket 52.

The unitary contactor 54 is inserted into holes 47 and 48 of the upper and lower polarizing flanges 41 and 42 respectively. The contactor 54, including the actuative coil 55 forming a part thereof, is framed upon a composite metal shell 56 whose upper and lower ends form the boundaries of the contactor where inserted into the holes 47 and 48 respectively, and whose parts will now be detailed.

The shell 56 comprises the upper, outer collar 57, fitting the hole 47, the connective head 58, the inner, upper tube 59 and the upper pole-ring 61; the foregoing parts being of mild steel. The head 58 and collar 57 together form a magnetic path from the upper polarizing flange 41, around the top of coil 55 to the steel upper tube 59. The middle portion of shell 56 is formed of the copper tube or corset 62, which leaves a long magnetic gap in the shell 56. Continuing downward, the copper corset 62 is joined to the lower pole-ring 63, which in turn is united with the lower tube 64 that fits into the hole 48. The lower tube 64 may be provided with a flange 65 to form a better mechanical and magnetic junction with the laminated polarizing flange 42.

The entire shell 56 is divided by a lengthwise split in one radial direction, preferably outwardly as illustrated in Fig. 6 by the lack of hatching. This split, designated 66—66 in Fig. 7, is matched by splits 67, 67 of at least equal width in the polarizing flanges 41 and 42. The purpose of the split is to prevent any circular secondary currents from flowing in and heating the shell 56 by virtue of the voltage induced therein from the alternating currents in the coil 55.

Within the magnetic, supporting tube 56 is contained an enclosed cell 68, which is filled with a protective gas 69. If the operating voltage of the contactor be low, the pressure of the gas need be but little above atmospheric, to assure that the reactive gases oxygen and nitrogen do not enter. For high voltages, there is substantial advantage in employing the filling gas under considerable pressures, such as ten atmospheres. One of the inert gases of the helium family may be employed, but hydrogen has the advantage that it may reduce oxide films formed on the contacting metals by any traces of oxygen left in the cell, and for this reason it is preferred. It adds the requirements that the cell be sealed tightly and, against any possibility of oxygen inleakage, that its case be shatterproof.

The upper wall of the cell 68 is formed by the insulating tube 71, as of a resinoid or shatterproof glass. This tube fits snugly within the pole-rings 61 and 63, and through gas-tight gaskets 72, 72 is pressed and sealed at its ends by members 73 and 74. Member 73 is a cap of metal or of impervious, strong insulating material, clamped upon the gasket 72 by a number of stay bolts 75, 75 and their nuts 76. If the cap 73 is of metal, the bolts 75 preferably should be insulated therefrom by the bushings 77, 77. The member 74 at the lower end of tube 71 is a cup formed of insulating material such as a resinoid, to be more fully described hereinafter.

Concentric within but insulated from the lower pole-ring 63, and screwed into the cup 74, is a spring-supporting ring 78 of mild steel; to which is welded or brazed a compression coil spring 79 of flat wire. This spring may be of carbon spring steel, but preferably should be of an alloy steel having somewhat lower magnetic permeance and much higher strength and vibratory endurance limit in share, such as chrome-vanadium steel. Alloy steel so selected may have endurance limits four to five times the maximum relevant stress in the operating deflection of the spring, and thus have practically perpetual working life. To the top end of spring 79 is welded or brazed the upper terminal ring 81 of mild steel. Instead of being separate from and fastened to each other, the spring 79 and its terminal fittings 78 and 81 may be formed integrally by machining from a blank consisting of a heavy-walled tube.

Through its supporting ring 78 and upper terminal ring 81, the spring 79 subtends the magnetic gap spanned by the copper corset 62, and thus completes through the contactor the magnetic circuits of both the polarization and the actuation. By a feature unique to my invention, the compression spring serves as the mechanical driving element in the magnetic system. That is to say, the magnetic flux led from one end of the spring to the other causes the faces of the successive turns to be attracted to each other, with force that is transmitted throughout the length of the spring 79. As the flux is led into and out of the spring substantially radially by way of the terminal fittings 78 and 81, there is no unbalanced other attraction; and in practical operation the actuation of the spring is calculable and smooth. Rings 78 and 81 should each have a single split, to prevent induced currents therein.

The stiffness of the spring 79 should be such that in reaction with the total mass of the loading upon its free end (plus one-third of the mass of the spring), the natural vibratory frequency of the moving system should be near that of the alternating-current supply in the actuative coil 55. Thus tuned to near resonance with the electric frequency, the moving system will vibrate with large amplitude (e. g. one centimetre total) in response to relatively small actuative current. In addition, the power component of this current is small; because the vibratory operation is almost purely elastic and because the actuative circuit is highly inductive.

If it is desired to operate the contactor substantially in phase with the power voltage concerned, as in simple or multiple rectification (distinguished from series commutation), the moving system should be tuned to respond to a frequency slightly lower than the electric frequency in the coil 55. This will cause the moving system to vibrate with a time lag slightly greater than 90 degrees behind the actuative flux and current. If the coil 55 be connected across the voltage being rectified then the lag of the actuative current, slightly less than 90 degrees in the inductive circuit, will bring the actuative motion substantially into phase-opposition with the voltage being rectified.

In contactor 54 of Figs. 6 and 7, the power circuit is closed and opened by the motion of a conductive, inverted U system in the lower portion of the cell 68. Specifically the U-blades 82, 82 of sheet copper edged with strips 83, 83 of sheet tungsten or molybdenum, are suspended from the actuative spring 79 (by means later detailed), above the two separate and insulated pools 84, 84 of liquid metal such as mercury or a dilute amalgam. In Fig. 6 these blades 82 are shown in their position of rest, to which they are returned by the spring 79 when the contactor is idle.

In the bottom of the insulating cup 74 are molded two copper plugs 85, 85, with their upper faces flush with the floor of the cup. The lateral surfaces of these plugs preferably should be plated with a metal such as nickel which is not wetted by mercury, in order to prevent the liquid metal from creeping out of the cell along the sides of these plugs by surface tension. The pools 84 are separated by a partition 86 molded as an integral part of the insulating cup 74. Through the plugs 85, the pools are joined to the external connection prongs 87, 87 which are adapted to be plugged into sockets (not shown) in a manner similar to that for radio tubes. Thereby a contactor at will may be connected into any power system to whose purposes it is adapted, and readily removed for replacement and repair.

By means of the insulating plug 88 securely screwed into the lower external tube 64, the cup 74 is held against the thrust from the bolts 75, nuts 76, cap 73 and cell tube 71, through its gaskets 72. The tensile reaction is of course carried back through the composite shell 56. For structural convenience, the cup 74 is circular in plan, the partition 86 is diametrical, and the pools 84, 84 are nearly semicircular.

By means of the pin 89, the U-blades 82 are fastened to a supporting member. This member 91 is one of three threaded tubes, through the coaction of which the height of the working edge 83 of the U-blade 82 may be adjusted. The lower tube 91 is externally finely threaded throughout most of its length; the intermediate tube 92 is correspondingly finely threaded inside and somewhat more coarsely threaded outside. The upper tube 93 is internally threaded with the second or coarser pitch and is externally fastened securely to the spring-terminal ring 81. Thus the U-blades 82 are carried by and driven through the three tubes 91, 92 and 93 in structural series. In order to insulate the blades from the spring system, one or preferably all three of these tubes are made of material such as a resinoid.

Across a diameter of the intermediate tube or differential nut 92 extends a pin 94, which is engaged by a long slot 95 in a tubular member 96. The upper end of member 96 is connected by the pin 96a to the extension tube 96b. The latter member is tightly threaded into the pipe elbow 97, into which in turn is threaded the check valve 98 having a sealing cap 99. The parts 96, 96a, 96b, 97 and 98 form a convenient wrench by which the differential nut 92 may be turned from without the cell 68. Thereby the height of the contacting edges 83 may be adjusted not only in very fine steps but also while the contactor is in vibratory operation. For example, if the thread pitches be 24 and 20 to the inch, the height adjustment will be only 0.008" per turn of the wrench. For a half-stroke of 0.187" below the neutral position, this adjustment is only 4.3% per full turn, and in practice it permits close regulation of the contacting period.

The tube 96a passes through a gland 101 made gas-tight by the packing 102, in turn pressed around the tube by the gland-nut 103. The body of the gland 101 is tightly screwed into the cap 73, or may be made integral therewith.

In addition to its part in the height adjusting, the tube 96a serves to connect the cell interior with the check-valve 98. Before operation of the contactor, the cell 68 by this channel is evacuated, then filled with hydrogen to a pressure a little above atmospheric for low-voltage operation or to many atmospheres pressure for high-voltage utilization.

Reverting to the spring system, it is desirable that some means be provided to prevent overtravel of the downward vibratory stroke, and preferably that the limiting be cushioned. Finding that a compressive spring of uniform pitch does provide the stroke limitation but with a rather sharp slap upon its simultaneous closure of all the turns, I have resorted to springs of pitch somewhat longer at the ends and shorter at the middle. Thereby a spring starts closure first at the shorter-pitched middle and, if further driven, closes progressively toward the ends. In consequence the impact and sound of closure upon moderate overdriving are reduced to negligible amounts.

I have found a convenient and accurate method of uniformizing the natural vibratory frequency of the loaded springs, from one to another. In forming the springs 79 with their upper terminal rings 81, a slight excess of weight is provided in the rings. The stiffnesses are tested by means of a dynamometer and an extensometer, and graphs plotted with force as ordinates against deflection as abscissae. The major lengths of these graphs are straight, with curvature of increased stiffness (slope) developing toward the ends as final closure occurs. The straight portion may show 0.180" total deflection for 15 pounds force, for example. The slopes of the tangent portions of the graphs of the several springs may have small percentage deviations from the intended stiffness corresponding to the basic loading. By turning in the lathe, the above mentioned excess weight is thereupon altered or entirely removed according to the amount of deviation of stiffness. For example, if a spring measures 1% stiffer than the intended, then 1% excess weight is retained in its loading. In the example of Fig. 6 and for the above-mentioned stiffness, the total loading is of the order of 100 grams.

In Fig. 8 is shown a modified form of elastic element that may serve instead of the compression coil spring 79 of Fig. 6, comprising the steel multiple bellows 104. This element somewhat resembles the multiple bellows used in aneroid barometers and, like the spring 79, is provided with terminal-ring portions 105 (lower) and 106 (upper), serving the same purposes and fitted to other parts in the same manner as in the spring.

The bellows 104, including its terminal portions is provided with a single longitudinal split to prevent annular currents being induced by the longitudinal actuative flux. Its juxtaposed faces 107 are attracted one to another by the flux; and when its stiffness is tuned with the loading to give natural periodicity close to the actuative frequency, a good amplitude of vibration may be attained. Like the coil spring 79, the elastic bellows 104 has some leakage of magnetic flux along its metallic path shunting the working gaps from face to face; and for this same reason its body also preferably should be of an alloy-steel having relatively low magnetic permeability. As with the spring 79, the actuative flux employed with the elastic bellows 104 may be polarized, for selective action in either vibratory or occasional contacting.

In Figs. 9, 10 and 11 are shown a modified basal cup and contained elements for contactor 54 having substantial advantages additional to those of the circular form in Fig. 6. Here the cup 108 is square in plan, the bottom plugs 85 therein are rectangular and, being larger in size and ampere capacity, may each be provided with two external connection prongs 87 instead of one. The contact compartments 109, 109, separated by the partition 111, are rectangular. It will be seen that the plural blades 82 coacting therewith are uniform in width, instead of fitted to a circle as in Fig. 6, and may be otherwise unchanged. In these rectangular compartments are fitted stationary contacts 112, 112, which present certain improvements of my invention now to be explained.

During 60-cycle operation of the contactor shown in Fig. 6, I have found in some cases that the mercury pools 84 are too mobile in their coaction with blades 82; with the result that the levels of the pools vary from instant to instant sufficiently to make the periodic contacting irregular. A good construction for providing sound conduction during the working portion of the cycle and more accurate timing of its starting and ending, is one employing as the stationary contacts 112 loosely assembled "books" of mercury wetted, vertical, sheet-metal laminations 113 set at right angles with the blades 82 and provided with slots 114 into which the blades penetrate on their downward strokes.

A metal that is well suited for economy, conductance and good wetting with mercury in the books is copper. A metal having the highest refractoriness to resist the erosive action of any sparking upon contact-breaking in inert gas is tungsten, or in somewhat less degree molybdenum. A suitable joining of these metals gives excellent means of efficient conduction combined with great durability. The cheap and good conductor copper is needed in the main body of the contact books 112, and small portions of the somewhat expensive and highly refractory tungsten are needed only at the contact-breaking edges of the slots 114. In addition, it is desirable that the tungsten portions be coated with a metal or alloy readily wetted with mercury, so that the benefits of the liquid metal may be carried to the edges.

In practice, I employ for the laminations 113 sheets of relatively thin copper topped for about ⅛" height with slightly thinner strips of tungsten or molybdenum edgewise welded or silver-brazed to the copper, and a thin coating over the tungsten of metal easily wetted by but not very soluble in mercury, such as copper or certain silver brazes. Tapes of the tungsten-edged copper so made are easily and uniformly stamped out to proper shapes profiled by the slots 114.

In like manner the tungsten tips 83 of the blades 82 may be coated with metal or alloy easily wetted with mercury. Thus wetted, the tips may be employed in occasional switching, or in vibratory contacting wherever the duration of vertical pick-up of mercury by surface tension is a sufficiently small percentage of the contacting period, or where the pick-up is sufficiently constant to permit accurate adjustment of the total time of the contact cycle. In such cases the wetting of the moving blade edges 83 additionally to the wetting of the sides of the slots 114 substantially increases the conductance of contact through each working period, and thus raises the efficiency and ampere capacity of the apparatus.

Since in each cycle of motion the blade edges 83 are lifted out of the slots 114 and must return accurately thereto, guiding means must be provided for the movement. I have found that plural sets of coacting cylinders and plungers serve this purpose well, and are also adapted to another valuable function. In Figs. 9, 10 and 11 are shown two metal cylinders 115, 115 and in sliding fit therewith two metal plungers 116, 116. The cylinders are fastened to the copper floor plugs 85 and stand through clearance holes 117, 117 in the book-form contacts 112. The plungers 116 are insulatively supported from a crosshead 118 that in this form suports also the blades 82. This crosshead may be a molding of resinoid, in turn fastened to the supporting tube 91 by the socket portion 119 molded over the tube-end.

The cylinders 115 and plungers 116 serve the additional function of equalizing the quantities of mercury or liquid amalgam on the two sides of partition 86. Whenever there is substantial sparking at the contacts, and of significant difference between the two sides, the continued vaporization of mercury induces gradual denuding on one side and accumulation on the other, unless counteracted. It may be offset by causing the parts 115 and 116 to coact as a pair of pumps working competitively. As seen best in Fig. 10, in each cylinder 115 is provided an inlet or suction port 121, and in each plunger a discharge port 122, placed high and aimed over the partition 86. If either pool 84 becomes drained below the top of inlet port 121, the discharge of its pump into the opposite pool becomes diminished, while the discharge of the other pump back into the first pool becomes actually increased because of the correspondingly higher flooding of its inlet port. It is readily seen that this cooperation should keep the two mercury pools relatively equal in level; and in practice, so it does.

In the operation of my improved contactors for vibratory conversion, I have found that irregularity of contacting is sometimes caused by splashing of mercury from the impact of the moving members with the liquid in open pools or even in the slots of the form of contactor 54 shown in Figs. 9, 10 and 11. Droplets of the liquid metal that are thrown upward on the downstroke of the moving members occasionally may span between the stationary contact elements and the tips of the moving ones after their parting, unless the free flight of these droplets is arrested. Such arrest is readily accomplished by means of the splash-guards 123, 123 illustrated in these three figures as flat vanes of thin metal attached to the moving blades just above the level of their maximum contactive penetration. In other forms of contactors set forth hereinafter, the splash-preventing function is performed by flat "contact manifolds" that carry the multiple salient contact members. The principle in all of these is that the arresting surfaces strike down the splashed droplets during the contactive portion and hence remove them from the open-circuit portion of the working cycles.

In Figs. 12 and 13 is depicted a form, 120, of the improved contactor more particularly suited to relatively high-voltage operation, by virtue of increased amplitudes of contact motion and of adaptation to longer creepage distances over internal surfaces of insulation. The polarizing and external actuative parts may be the same as in Figs. 6 and 7, the same part numbers thereof are employed, and their explanation need not be repeated here. For the same reason as in contactor 54, the entire shell 56 has one longitudinal split 66, matched by radial splits 67 in the polarizing flanges 41 and 42. Since contactor 120 is intended for relatively high voltages, its coil 55 is jacketed with extra insulation 124.

The enclosed cell 125 of contactor 120 is filled with gas 69 (such as hydrogen) as in contactor 54, generally at higher pressure because of higher operating voltage. The principal differences are in the case and in the internal parts. The upper wall and dome are formed of the insulating tube 126, as of molded resinoid. Into it is taper-threaded and cemented top plug 127 of copper, whereof the relatively high expansion coefficient is suited for fitting with the insulating material, of still higher coefficient. The lower member of the enclosure is the insulating cup 128, also as of molded resinoid.

The example of elastic and actuation elements in Fig. 12 differs from that in Fig. 6 in that they are here separate rather than combined as a compression spring. The tensile coil spring 129 is employed to support the moving contactive elements. For vibratory contacting, its stiffness in relation to its loading is such that the natural frequency of the moving system is close to the actuative frequency, as explained in relation to Fig. 6. For discontinuous switching the spring may be made much less stiff, in favor of easier magnetic actuation.

In contactor 120, the internal actuation element is the pair of mild-steel semicircular half-plungers 131, 131, the lower periphery of which is of such height at neutral position as to be attracted downward by magnetic flux subtending therefrom to the upper edge of pole-ring 63. This attraction is accentuated by the shaping of the exterior of the half-plungers with a median waist, leaving the upper portion with a rim disposed at neutral position to be attracted downward by the upper pole-ring 61. The parts 131 are made semicircular and peripherally separated in order to prevent induced circular currents. Diametrically, they are strongly joined together by means of the steel pin 132 tightly fitted in the spring-foot 133 and countersunk-riveted in the outer faces of the half-plungers. For reasons of electric conduction as will appear, the spring-foot 133 is preferably made of copper.

The spring 129 is strongly fastened to spring-foot 133 and to spring-head 134 (also of copper for good conduction) by means such as helical grooving of these end fittings screwed into about one spring turn each, and preferably also by silver-soldering. If the spring is of a good conductor such as beryllium-alloyed copper, it may carry a fair proportion of the power current to the contacts detailed below; but as other means are also provided for this conduction, the spring 129 may be of steel or alloy steel. It is not desirable that the spring should carry a relatively large power current to the contact system, for the reason that in so doing, the amplitude of its motion is likely to be disturbed by the electromagnetic attraction among its turns and thus by the variations of the power current or loading. Variable electric heating of the spring is also undesirable.

The electric shunting of spring 129 is done by elements that perform additionally the valuable function of accurately guiding the vertical movement of the spring-supported parts. In the spring-head 134 are provided one central or preferably plural, symmetrically spaced long bores 135 adapted to receive long plungers 136, 136. The fitting 134 being of copper as stated, the plungers 136 preferably should be of a stiff good conductor such as beryllium copper. In order to prevent erosion by the mercury the bores 135 and the surfaces of the plungers 136 may be thinly clad with a relatively hard metal, such as a copper-nickel alloy, that is wetted by but not very soluble in mercury. These coatings are not shown, but will be readily understood. For example, they may be provided as thin tubes, pressed into the bores and onto the plungers respectively.

By means of drain-holes 137 and gutter 138, the coacting bores and plungers are kept wetted with mercury rising as vapor from below and condensing on the upper, cool parts. The mercury serves both as lubricant to the plungers and as a superior agent for electric contact between these sliding parts.

The top plug 127 is continued upward into the threaded extension or stud 139 having a tall nut 141 for clamping the tongue 142 of the cable terminal 143 serving as the top connection to the external power cable 144. Extending into a hollow within this nut and protected thereby is the short external nib of a metal gas-filling tube 145. This small tube, brazed into the stud 139 communicates with the interior of the cell by the long passage 146. The cell is evacuated and then gas-filled under a pressure suited to the operating voltage; and while the pressure is held the small tube is then squeezed, heated to a welding or brazing temperature and cooled. This known method of sealing off is given as an example, but other procedure may be employed therefor.

The contact manifold 147, by means of the stem 148 is fastened to the spring-foot 133. The contact manifold is provided with holes 149, into which are tightly fitted contact pins 151, 151. As in the blades of contactor 54 in Fig. 6 the pins 151 may be of copper provided with tungsten tips 152, or they may be of tungsten throughout. As shown hatched in Fig. 13, they are spaced in a uniform pattern, preferably at the corners of equal squares about twice as large on a side as the diameter of the pins. The pins here conduct vertically only, rather than in a path of inverted U form.

In non-periodic or low-frequency periodic operation, sufficient precision of contact timing may often be attained by employing to coact with the moving pins 151 a simple pool of liquid metal. However, in Figs. 12 and 13 is shown such a pool 154 modified by the addition of liquid-stilling means. The illustrated stilling agency comprises a set of vertical stationary pins 153 of size and spacing similar to those of the moving pins 151, 151, fixed to the floor-plate 153a, and of length sufficient to project slightly above the surface of the liquid metal 154. As seen in Fig. 13 the pattern of the moving pins 151 is so spaced in relation to that of the stationary pins 153 (unhatched) that the moving ones dip into the mercury without touching the fixed one. In lower-voltage units therefore, the stationary pins need not be of spark-resistant metal; but in units of voltage sufficiently high to sustain elongated arcs that might reach the pins, they should be made of tungsten.

I have found these stationary pins considerably effective in stilling the surface of the pool by causing wave interference and damping; but the effect can be furthered by an additional means here illustrated. It consists of the wound hollow body 155 of wire gauze, occupying the space between the pins 153 and the wall of the cup 128. The function of this hollow, porous body is to damp out any residual waves rather than allow them to be reflected from the cup wall.

The contactor of form 120 is well suited to operation in serious commutation, where the contacting period is relatively short. With approximately sinusoidal movement, the pin tips 152 require relatively shallow penetration in order to make contact for brief intervals. In such cases, generally requiring greater contactive precision, there is less disturbance by the shallow dipping. For large ampere capacity, the shallowness of penetration can be offset by an ample number of pins 151.

The bottom power connection of contactor 120 is completed by way of the single copper stud 156. The stud is molded into the basal cup 128 with the head 157 flush with the cup floor, for contact with the mercury therein. The stud 156 is extended downward as a connection prong 158 adapted to be plugged into a socket (not shown) included in the power circuit served by the contactor. For securer molding the stud is provided with a shoulder 159 keyed into the bottom of the cup 128; and the lateral surface of the stud may be nickel-plated to prevent capillary creepage of mercury. Screws 161, 161, preferably with self-locking threads, are fitted into the top of stud 156 to hold down the floor-plate 154.

In Fig. 14 is shown a modification of the contact elements of my improved contactor wherein the moving pins 151 and stationary pins 153 of Fig. 12 are made so slim and so closely spaced as to constitute pliable bristles 162 and 163 of respectively movable wire brush 164 and stationary wire brush 165. I have found that if two brushes of closely spaced fine wire bristles are brought together bristle-end-wise and approximately parallel, they will mesh with little mechanical impact for considerable penetration, and that in so doing they will make reliable, low-resistance electric contact. As in Fig. 12, the lower bristles 163 are set in stationary pin-plate 153a and the upper ones in movable contact manifold 147. The lower brush 165 may be submerged in mercury 166, nearly to the tops of its bristles 163.

In operation of the contactor having these small-wire contact brushes and mercury, the moving bristles make contact with both the stationary bristles and the submerging mercury. The mercury increases the area and ampere capacity of the contacting surfaces, and the lower bristles reduce the agitation of the mercury by the moving bristles. The moving and stationary bristles preferably should be made of a refractory metal such as tungsten. This brush form of coacting contacts is adaptable to short or long periods of contacting, by adjustment of the neutral position and the amplitude of motion of brush 164.

Fig. 15 shows in plan section the moving contact pins 151 of Fig. 12 coacting with a mercury pool having instead of the stationary pins a stilling means comprising a grill 153a of square-spaced, thin vertical separators. The grill is formed of vertical strips intersecting each other by means of slits in the familiar manner (as in egg cartons), and suitably fastened to a floor-plate. The strips of the grill may be of metal, or of thin insulation such as mica or micanite. If of insulating material, the grill may impart greater precision to the contact timing; because there is then no stray contacting between the moving pins 151 and a conducting grill, by subtending mercury droplets or sustained sparks. The pockets in the meshes of the grill should be made to communicate with each other as by small holes through the strips, in order that the static level of the mercury may be equalized among all.

In Figs. 16, 17 and 18 is shown an improved cellular contactor 167 wherein connection may be made selectively and usually cyclically, between either of two pairs of terminals. This function is in common with that of the contactor in Figs. 1 to 5 inclusive; but more particularly than those in the first figures, the presently described form is designed for heavy ampere capacities. With appropriate dimensions and materials, it is also suitable for high-voltage operation.

In these figures the case 168 is made of a molded material such as a resinoid or glass, and may be formed as front and rear halves as shown in Fig. 18. The vertical profile of the case 168 is bottle-like and continuous, including the shaped floor 169, the body 171, the stem 172 and the closed top 173. Its halves are strongly clamped together by the bolts 174, 174, with an intervening, gastight, cemented gasket 175, and evacuated and gas-filled by means not shown.

Fitted to the exterior of case 168 is a ferromagnetic assembly comprising the mild-steel pole cap 176, two bar permanent magnets 177, 177 of alloy steel, and the laminated horizontal C-shaped flux-ring 178 with two salient poles 179, 179. The laminated flux-ring is wound with coil 181, disposed to form poles at the salients 179 and, for periodic operation, excited with alternating current synchronized in any desired phase relation with the power current being rectified or commutated. For non-periodic operation, the coil 181 may be excited with either an impulse or a holding current in either direction selectively.

Within the case at the top is firmly mounted the reed-head 182, of rectangular form fitted to the rectangular cavity bounded by the internal rim 183. Integral with the reed-head 182 at its center (Fig. 16), is the reed 184. From the head 182 to a level slightly below the salient poles 179, the reed is of magnetically permeable steel of high elastic modulus, and therebelow it comprises a strongly welded-on extension 185 of non-magnetic steel such as 18% Cr, 8% Ni alloy. Upon the lower portion of the permeable reed are mounted right and left, steel armatures 186, 186 for receiving the flux from the salient poles 179, without bringing the reed too close to the wall of the case-stem 172 for proper mechanical clearance.

The reed 184 is polarized by the permanent magnetism in the circuit 176—177—178—179—186—184—182—176. Accordingly, it is selectively sensitive to the direction of excitation in the alternating-flux circuit 179 (left)-186—186—179 (right)-178—179 (left), and is attracted to the right or left salient pole 179 having the stronger sum of polarizing and actuative magnetism. If the reed and its loading are tuned to a natural frequency near that of the electromagnetic actuation through the coil 181, the reed system will swing rythmically with a large amplitude determined partly by the actuative current.

To the lower end of reed-extension 185 are strongly fixed the moving metal contact bars 187, 187, two in number. The bars may be uninsulated from one another, but in general it is preferred that they be separated right and left by the insulating member 188, in order to increase the electric clearance between live movable contacts and idle stationary contacts. The bars and insulating members should be strongly fastened to the reed-extension 185 as by means of the insulating inserts 189, 189 and set-screws 191, 191.

Upon the floor 169 and against the walls of the body 171 of the case 168 are mounted the stationary contacts 192, 192, four in number. Stationary contacts 192 are formed of corrugated laminations 193 and tungsten lamination margins 194. The laminated assemblies are firmly mounted upon copper channel-bars 195, 195, in turn fitted closely into the case body 171. The channel bars are first joined to the prongs 196, 196 mechanically or by welding, and the combined angles and prongs molded into the halves of the case 168. The channel-bars are provided with dove-tails 197, 197, and onto these are fitted the laminations 193. Before closing the case, insulating spacing members 198 are keyed onto the dove-tails and between the front and rear contacts 192 of Fig. 18.

Upon the impact of the moving contact 187 against the stationary contact 192, the latter is driven horizontally a short distance by virtue of the resilience of its corrugations. If by selection of the thickness and corrugation profile of the laminations 193 in relation to their masses, their horizontal stiffness is such as to give them a natural periodicity slightly higher than the contactive operating frequency, the stationary members will not bounce away from the moving ones upon impact, but will be driven back and return in persistent contact. This form of contactor is well adapted to be operated at high voltages and with brief contacting periods as in series commutation.

The contact-auxiliary function of liquid metal may be availed in contactor 167. A small amount of mercury 199 may be placed on the concave floor 169 of the cell case and the moving insulating member 188 provided with a downward extension or sweep 201 dipping lightly into the mercury when at rest. Under periodic motion the mercury is thrown by sweep 201 up onto the faces of the stationary contacts 192 and moving ones 187. If the faces of these contacts are wholly or partly of a metal easily wetted by mercury, such as copper, they will be protected from any sparking, by the vicarious sparking and vaporization of the adherent mercury. For severe or emergency operation, the mentioned tungsten lamination margins 194 of the stationary contact laminations 193 may be made to share the sparking with the mercury, as by providing half the laminations with such tungsten margins interspersed with the other half of plain copper wetted by the mercury. The moving contact bars 187 may likewise be built of horizontal laminations (not shown) with alternating copper and tungsten contacting edges.

In Fig. 16 attention is called to the showing that the polarization is not opposite as between the right and left salients 179, 179, but rather as between these parts and the pole-cap 176, and thus between the lower and upper ends of the ferromagnetic reed 184. In this arrangement the divided vertical path of the polarizing flux is one of constant reluctance, as is also the horizontal, series-gap path of the alternating flux previously outlined. The rectangular polarizing magnets 177, 177 are encased in shells 202, 202 of non-magnetic and preferably highly conductive metal such as copper, the ends of which are formed over the ferromagnetic end plugs 203, 203 and 204, 204. To complete the structural assembly, these plugs in turn are fastened to the pole-cap 176 by the bolts 205, 205 and to the flux-ring 178 by bolts 206, 206. These bolts may be secured by lock-washers 207, 207.

In Figs. 19 and 20 I have shown a variant of the improved contactors wherein the primary movement is rotary and is converted into reciprocation driving the moving contacts. Here the contactor 208 as a whole is shown medially supported upon the insulating plate 209, which may carry any number of units appropriately connected among themselves and to a power system for rectification or commutation.

The contactor 208 comprises the case 211 and the external and internal functional elements. The case is divided into three parts, the upper shell 212 of insulative material, the metallic pelvis 213, and the lower insulative shell 214 hung from 213. The upper shell 212 supports the external and guides the internal electromagnetic actuation elements. The pelvis 213 and its appurtenances externally support the whole contactor, internally support and guide the moving elements (driving, translatory and driven), and electrically connect the moving contacts with one of the external terminals. The lower shell 214 supports and houses the stationary contacts, and mounts the other external power terminal.

In the upper portion of Fig. 19, the motor 215 comprises the external stator 216 and the internal rotor 217. The motor has a single winding structure in the stator 216, but the rotor is divided into the magnetically polarized field 218 (also marked N—S) and the secondary squirrel-cage 219. The magnetic gap between stator and rotor is occupied by the thin wall of upper shell 212 and by a close clearance 221 between the interior of the shell and the periphery of the rotor.

The stator 216 is of a standard synchronous-motor construction on a small scale, having the winding 222 in slots 223, 223 of the laminated core 224. The winding is polyphase, and of suitable design for the voltage, frequency and required torque. For a reason that will appear in reference to the rotary-reciprocative, translatory device, the winding is here four-polar. The stator through the core 224 is supported and fixed by the housing 225, in turn supported through arms 226, 226 from the clampring 227 fastened to the shell 212 near its top. The rotor shaft 228 is accurately centered by the ball bearing 229.

After it has been brought up to speed by starting means, the rotary field 218 is synchronously driven by the travelling flux of the stator winding 222. As a most convenient and effective starting agency, I have incorporated the secondary squirrel-cage 219 on the same shaft 228 and within the influence of the common stator winding 222. After synchronism is attained the squirrel-cage obviously contributes no torque, but it serves usefully to prevent hunting by the synchronous field. The field 218 is formed of a single piece of alloy steel permanently magnetized with four poles as indicated above the axis of symmetry in Fig. 20. The pole-ends N and S are shaped somewhat as shown in order to facilitate protection to the permanent magnet against demagnetizing action from the stator while starting by the collaboration of the copper damper 231 intervening between the poles and partly covering their ends. The rotor of the induction motor is completed by the laminated steel core 232 interlocked with the squirrel-cage 219 and fitted to the shaft 228. The copper of the damper 231 may be integral with that of the squirrel-cage 219.

The induction motor, through the common stator winding 222, is effectively in series with the synchronous motor. Upon starting the composite motor at its full voltage, the damper 231 contributes some torque; but its main effect at that time is, through mutual induction largely to remove the inductive reactance of the upper or synchronous-motor portion of the stator winding. This leaves nearly the full voltage applied to the induction motor, which therefore develops large starting torque and rapid acceleration. The variable reluctance around the periphery of the synchronous-motor rotor contributes pull-in torque to that of the permanent magnetism.

After synchronism is attained the induction motor (now torqueless but anti-hunting) remains as an unloaded transformer in series with the synchronous motor. If the synchronous motor is overexcited by its permanent field and thus made condensive, there will be an inductive drop in the induction motor, to meet the overall voltage. The wattless exciting current can be made small or even zero; while the actuative power current is fixed by the mechanical work of the contactor plus the total actuative losses.

With the wattless and power actuative currents derived from design and testing, the phase of rotation and contacting becomes known. It may be adjusted in relation to the main current, by alteration of the permanent-field strength, by shifting to other points of connection in the power-transformer polyphasing from which the actuative current is supplied, by similar shifting of (symmetrical) connections around the polyphase stator winding 222, by angularly shifting the stator with respect to shell 212, or by other improved means hereinafter set forth with reference to Fig. 32.

The shaft 228 is supported and centered near its lower end by the thrust-and-radial ball bearing 233, in turn sustained and centered by the metal pelvis 213. On the extension of the shaft below this bearing is fixed a grooved, cylindrical cam 234. The pattern of the grooving 235 when considered in development, is preferably a sinusoid of two whole cycles, i. e. two peaks and two valleys. Cooperating with cam 234 are two roller-type cam followers 236, 236 spaced 180 degrees apart and mounted upon journals 237, 237, which are fixed to sliding cylinders 238, 238.

These slides 238 are free to move up and down, supported only by the journals 236; and they are accurately positioned on the axes of the guide rods 239, 239 that are rigidly fastened to the pelvis 213. The slide-tubes are provided with holes 241, 241 through which liquid metal, precipitated upon the outsides of the tubes from splashing or volatilization at the contacts below, percolates to the bores of the tubes. There it wets the junction between the guide-rods and slide-tubes, lubricates their relative motion and, of great importance, enhances the electric conductance therebetween. The slide-tubes, the guide rods and the pelvis are made of stiff, highly conductive metal such as hard-drawn copper or preferably beryllium-copper. In order to prevent erosion of the sliding surfaces by mercury, the bores of the slide-tube and the surfaces of the guide rods may be thinly veneered with material wetted but not dissolved by mercury, such as an alloy of copper and nickel.

To the slide-tubes 238 jointly is rigidly fixed the moving contact 242. This contact is made up of the plural blades 243, fixed in the contact-head 244, which is fastened to the tubes 238 by means of the pin 245 or other suitable means; the pinning being somewhat diagrammatic for clarity. Coacting with moving contact 242 is stationary contact 246, here shown in the mercury-wetted, laminated form previously described. The slots 247 are aligned with moving blades 243, and the "book" of laminations is held down by bars 248, 248 and screws 249, 249 to the copper block 251 whose top is flush with the floor of the shell 214. The floor-block 251 is externally connected to the power terminal 252, held by the clamp-bolt 253. The other power terminal 254, by means of its clamp-bolt 255, is connected to the external flange 256 of the pelvis 213.

A small amount of liquid metal is contained as a pool 257 in the bottom of shell 214, bathing the lower part of stationary contact 246 and wetting the contact faces of slots 247. It will be seen that the operation of the lower or contacting part of contactor 208 is much the same as that of contactor 120, Fig. 12. The double-sinusoidal or 720-degree slotting of cam 234 matches the four poles NSNS of the synchronous motor, and causes the contacts 242 and 246 to coact in synchronism with the actuative current. The contactor cell is closed by cementing and tightly screwing together the taper-threaded joints 258 and 259, and is evacuated and gas-filled by means not shown.

Contactor 208 is suitable for utilizations requiring extremely close precision of contact timing, in combination with high working voltages. It is adaptable to variations, such as the driving from a single cam having a multiplied number of groove peaks and valleys, of a succession of moving contacts 242 coacting commutatively with plural stationary contacts 246, with suitable insulative separations. The synchronous actuation and its induction-motor starting are not tuned to a fixed frequency, hence contactor 208 may be used in commutating generators as well as converters. By special design, the actuative motor could be driven with direct current, as in "inversion" from direct to alternating-current power.

I have found that in combination with their other valuable properties my cellular contactors can be made self-polarizing of their actuation, by simple electrical means, and with their permanent magnets omitted. Two forms of electric polarizing means are shown, in Figs. 21 and 22. Both depend upon the principle of supplying to their coils actuative currents that are periodic at the power-current frequency but are nearly or quite unidirectional.

In Fig. 21 is shown by diagram a contactor 261 (of the general form of Fig. 6) whose polarized actuation is effected by means of the connection of the actuative coil 55 directly across the power terminals 87, by means of the coil leads 262, 262. When power voltage is applied across the terminals 87, the resultant current in coil 55 produces a flux in the magnetic circuit through the upper composite pole-tube 263, the spring-head 81, the spring 79, the lower spring-supporting ring 78, the pole-ring 63, the lower tube 64, the lower composite pole-tube 264 and the coil-covering tube 265. With the exception of the high-carbon or alloy steel spring 79, all of these external and internal magnetic parts are of mild steel; and the internal assembly and external assembly thereof each has a single full-length open split, to prevent Foucault currents.

In one example of its utilization, this contactor serves as an interrupter in series with direct-current input to an "inverter" to alternating current. When the spring head 81 is drawn down by the inner-turn attraction of the spring 79, the blades 82 short-circuit the pools 84, the terminal prongs 87 and the actuative coil 55. This removes the magnetic attractive force and allows the blades to rise out of the pools after the swing of system momentum. Thereupon the system is again attracted downward, and after completing the upward swing comes down to repeat the cycle. This vibratory system becomes stabilized at a frequency determined by the stiffness and the inertia of its parts; and it may be adjusted to give a long contact duration per cycle.

In another example of its utilization, contactor 261 may serve as a half-wave rectifier in series with an alternating-current output. If the internal vibratory system be tuned close to the frequency of the alternating current, the movement and resultant contacting will become stable at a particular duration of contact per cycle. The duration can be controlled, as by adjustment of the static clearance between the blades and pools. This means of polarizing, i. e. of producing large differences between halves of the cycle of actuative flux gives the tuned vibratory system a greater responsiveness at the power alternating-current frequency than would be the case with unpolarized actuation. With the vibratory system tuned at 60 cycles and excitation supplied unpolarized at this frequency, there would be 120 impulses of magnetic attraction per second. This double number of impulses could produce 60-cycle vibration, but less effectively than could 60 impulses per second.

In Fig. 22 is shown a contactor 266 of the general form of Fig. 12 but having polarized means external to itself, comprising a small half-wave rectifier 267 in series in leads 268 between the alternating-current power source 269 and the actuative coil 55. The small rectifier 267 may be of the junction type; and its function is to cause the actuative flux, now unidirectional, to produce attractive force in only one (the downward) direction of the vibratory movement. In this form the polarizing magnet is absent, the coil 55 is again iron-clad in the tube 265 as in Fig. 21, and the remaining parts and their numbers are the same as the pertinent ones of Fig. 12.

In some cases it is advantageous to combine certain parts from one form of contactor herein with other elements from another form illustrated, to produce still another modification of the contactor. For instance, it may be desired to exploit actuative elements of the compressive-spring type in combination with pelvic contactor support, sliding lead-in of power current, and vertical rather than inverted-U conduction thereof.

Figs. 23 and 24 show such a recombination into an improved design, of essential elements adapted from Figs. 6 and 19. The part numbers are mainly borrowed from these figures, with new ones where needed. This contactor is designated 271, and comprises the case 272 formed of the upper shell 273 of insulative material, the metallic pelvis-ring 274, the lower or cup-insulative ring 275, and the metal cup 276 having the integral terminal post 277. The cup and terminal post should be of a metal or alloy of reasonable good conductivity and insoluble in mercury, such as beryllium-alloyed copper.

For contactor 271, the magnetic system comprises the polarizing elements 36 to 53, inclusive, the external actuative parts 55 to 67 inclusive, and the internal, compressive-type actuated elements 78 to 81, inclusive, all similar in nature and function to the corresponding parts in Fig. 6. The cell is filled with protective gas 69.

In Fig. 23 the drive-transmitting and height-adjustive parts are modified in detail from those of Fig. 6. In the upper hollow of spring-head 81 is suitably fastened as by rivets (not shown) the insulative bushing 278 supporting the metal fixed nut 279 molded thereinto. The bushing 278 is provided with ventilative holes 281, to prevent pneumatic compression by or excessive damping to the motion of the spring-head. The height-adjustive elements for the driven system comprise the nut 279, the stud 282 which may be turned in this fixed nut, thereby to raise or lower the stud and its dependent, driven parts, a pin 283 for a spanner wrench, and some simple locking parts. These are teeth 284 on the upper end of nut 279, mating teeth 285 on the detent ring 286, and a light compressive spring 287 to hold down the detent ring as it is turned around by stud 282. The stud has a spline-groove 288 engaging the ring 286.

As in contactor 54 of Fig. 6, the stiffness of spring 79 is of such value in relation to its total carried load as to give the moving system a natural vibratory frequency of a required amount. By means of the connecting tube 289, fitted to the lower end of stud 282, the magnetically actuated motion is transmitted to the contacts below. In order to relieve the moving parts of possible lateral force and binding, the connecting tube 289 may be provided at either end with a socket 291 mating with a ball 292 forming the lower end of stud 282 and with another ball 293 on the driven contact-head below.

As in Fig. 19, the electric system of contactor 274 comprises the pelvic, supporting upper terminal, the sliding current lead-in, the moving and stationary coactive contacts, the liquid metal, and the lower or post terminal. In this form there is a change in the cross-sections, but not in the functions, of the mutually sliding current lead-in parts as compared with Fig. 19.

The supporting members include the metal pelvis 274, having a slightly tapered integral hip-ring 294, the correspondingly tapered seat-ring 295, and the structural plate or shelf 296, supported by means not shown. If this shelf is of metal of sufficient conductance, it may serve as a paralleling means for multiple contactors or as a contactor neutral in polyphase rectification. If it is of insulative material it may mount plural contactors connected otherwise, as in series commutation. For that purpose a copper connection-plate 297 is shown. Seat-ring 295 and connection-plate 297 are fastened to shelf 296 by means of screws not shown. An insulating tube 298 may be interposed between the seat-ring 295 and the polarizing parts. The permanent magnet 36, through the spacing ring 45 is here supported upon the shelf 296 in the same general manner as in Fig. 6, and clamped thereto by the bolt 38 and nut 39. A convenient arrangement comprises two contactors and one magnet in each polarizing assembly.

Supported upon the metal pelvis 274 by means of the thread 299 is the stationary metal crown-ring 301 from which depend the integral slide-prongs 302, 302. As shown in Fig. 24 these prongs are eight in number, arranged in four pairs; but in some contactors I have built there are eighteen prongs wedge-shaped in horizontal cross-section, leaving eighteen rectangular grooves therebetween. Engaging with the grooves 303, 303 between these stationary prongs are tongues 304, 304 extending horizontally from the moving contact-head 305. By means of the thread 306 the contact head is fastened to and supported by the ball 293, and thus driven by the connecting tube 289 from the actuative system.

The contactive members here illustrated are moving blades 243, 243 and the laminated or "book-form" stationary contact 246 having the mercury-wetted pockets 247, 247 of the same general form (and part numbers) as in Fig. 18. Similarly, the stationary contact 246 is fastened by means of the bars 248, 248 and screws 249, 249 to the floor of the contactor cell. The bottom of the cell is completed by the metal cup 276; which is supported by, insulated from and hermetically sealed to the pelvis-ring 274 by means of the cemented or molded bushing 275, as of resinoid.

The lower electric terminal is the post 277, integral with the cup 276. The externally sealed hole 307 in the pelvis-ring 274 illustrates a means of evacuating and gas-filling the contactor cell.

Fig. 25 illustrates a form of the contactor that I have built, in which the blade-and-slot construction of the contact members is replaced by the mercury-dipping, multiple-pin assembly set forth with reference to Figs. 12 and 13. This contactor, designated 300, is favored because it has proven in operation and durability one of the best combinations of my improved elements. Only a few of the part numbers are shown, but the other are the same as in the corresponding sections of Fig. 23 on the one hand and Figs. 12 and 13 on the other. Here the case 272 comprises the shell 273 of insulation, the metal pelvis-ring 274, the cup-insulative ring 275 and the metal cup 276 having the terminal post 277. The magnetic system comprises the polarizing elements 36 to 53, inclusive, the external, actuative elements 55 to 67, inclusive, and the internal, actuated elements 78 to 81, inclusive. The cell is filled with protective gas 68.

The supporting members again include the pelvis-ring 274 having the hip-ring portion 294, and include also the seat-ring 295, the shelf-plate 296 and, if the shelf is insulative, the connection-plate 297. Internally, the pelvis-ring 274 supports the metal crown-ring 301 having the mercury-wetted slide-prongs 302 and intervening grooves 303. Engaging the grooves are the tongues of the metal moving contact-head 305. The contact-head is supported on the spring system through the connecting-rod 289 and insulative bushing 278.

The contactive members include the pins 151 of refractory metal such as tungsten, tightly fitted into holes in the contact-head 305, spaced in a uniform pattern, and the liquid-metal pool 154. The metal stilling pins 153, fixed to the metal floor-plate 153a, are spaced to clear the moving pins 151; and the wound wire-gauze annulus 155 is found to impart further stilling to the pool in operation.

Figure 29:
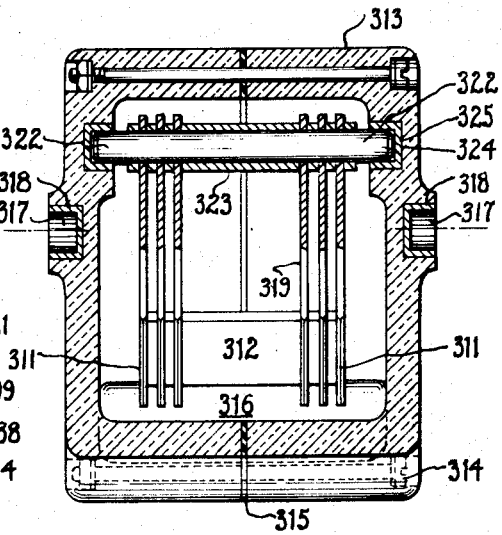

Figs. 26, 27, 28 and 29 show a form 308 of my improved contactor more particularly suited to non-periodic or slow periodic switching of relatively heavy currents, and adapted to be actuated gravitationally by tilting. Fig. 26 shows the contactor in its closed position, and Fig. 27 shows it tilted to its open state. Fig. 28 reveals that the fixed contacts 309, 309 are two in number, and Fig. 29 shows that the swinging contacts 311, 311 are connected to one another by swinging bar 312. Herein, with reference to those four figures the word "fixed" means fastened to the case of the contactor rather than fixed in space, and the word "swinging" means pivotally movable with reference to the case.

The case 313 of contactor 308 may be of molded insulating material such as a resinoid or glass. It is divided into similar halves which are clamped together by means of the bolts 314, 314 with an intervening, cemented, gastight gasket 315. The case contains a pool 316 of mercury or liquid amalgam; and after closing upon the gasket it is evacuated and sealed off through means not shown. If the contactor is to be used in switching alternating currents it may be left thus, but if its service is to be interruption of direct currents it should preferably then be filled with hydrogen at one or more atmospheres pressure according to the voltage of its use.

The case 313 may be externally supported and pivoted on the sockets 317, 317, which are shown lined with metal thimbles 318, 318 for smoothness of bearing. The operation of the contactor by tilting may be done by hand, or means (not shown) may be provided for electromagnetic or mechanical movement to suit the convenience of the utilization.

When the case is tilted as from the Fig. 26 position to the state in Fig. 27, the contacts 311 and bar 312 swing from proximity to the left to that with the right wall of the case. In the left position the swinging contacts 311, comprising the plural blades 319, 319 are interspersed and electrically engaged with the plural clips 321, 321 of the fixed contacts 309. Sufficient clearance is provided between the sides of the blades 319 and clips 321 to facilitate free swinging into and out of engagement; but electrically this clearance is changed to superior contact by intervening liquid metal. That is to say, the blades and clips are made of copper, are prewetted with mercury, and by surface tension their clearances become filled with liquid metal from the pool 316. As the engagement areas and the cross-section of bar 312 are large, the ampere capacity of the contactor is high.

Electric connection from the forward and rear contacts 309 (left and right in Fig. 28) is made not solely by bar 312, but is shared by the metal pool 316. The common support of the swinging members comprises the shaft 322, and the cover-tube 323. The cover-tube may be divided into sections interspersed with the blades 319 and made tight as by pressed fitting or silver brazing. The ends of shaft 322 are journalled in the metal bushings 324, 324 in the internal sockets 325, 325.

When the contactor 308 is tilted into the position of Fig. 27, not only do the solid contacts disengage, but the bulk of the liquid metal also falls away from the fixed contacts 309. In this action, the wetting films between the blades and clips may remain as the final conductors at circuit interruption. Thus the liquid metal takes upon itself any sparking that occurs, and by this vicarious action protects the solid metal from spark-wear. Where severe or frequent sparking or prolonged arcing is to be expected, the parting edges of the blades 319 and clips 321 may be composites of tungsten cores and copper coating, whereby the wetting benefit may be combined with the high refractoriness of the core metal. Alternatively, the case can be so shaped as to cause the final break to occur in the column of mercury between the fixed contacts.

The stationary contacts 309 are mounted by means of the integral plugs 326, 326 molded into the walls of the case 313. Each plug 326 is extended outside into a threaded stud 327. It is fitted with a cable terminal 328, washer 329 and clamp nut 331, or with equivalent means of connection to the power circuit to be switched.

In all of the exemplary contactors herein employing liquid metal, the liquid may be simple mercury or a metal or amalgam liquid at or near room temperature but having effectively a high boiling point. Such a metal is gallium, M. P. 30°, B. P. about 2,000° centigrade; but its present cost is too high for ordinary utilization. I have found that inexpensive liquid amalgams of mercury with small percentages of such metals as indium, tin or bismuth, give an operative advantage in cases of heavy sparking. In such a case the contact member loses at a hot spot momentarily a portion of the mercury of its wetting but retains a film of the higher-boiling metals which, because of their rather low melting points and considerable mercury solubility when hot, keep the liquid metal in supply and wetting activity at the hot spot.

Other somewhat mercury-soluble metals of high boiling point but not necessarily low melting points, such as silver, have proven considerably effective to the same end. In cases of possible residual or seepage oxygen in the cell the film of spark-deposited silver has considerable oxidation resistance; and for extreme cases still other metals may be considered. In practice, I have made a saturated solution of the mixed metals tin, silver and copper by dissolving their powders in boiling mercury under reducing gas, cooling the solution and filtering out the precipitated excess through chamois skin. Being saturated with copper and silver, this solution has shown little or no tendency to dissolve into itself the internal copper parts or silver-brazed joints. It is known of course, that the mercury solubility of the mentioned metals is low at room temperature and not very high at the boiling point of mercury.

In Fig. 30 is diagrammed a method of electric conversion employing vibratory contacting, combining large conduction through a rectifying contactor with a small final conduction in each rectifying cycle through parallel-operative auxiliary rectification such as junction or vapor rectification. Single-phase, half-wave rectification is illustrated in this figure as an element, and polyphase combinations thereof are exemplified hereinafter.

In this figure the transformer T is served by the power source G through the leads p, p. The secondary of the transformer is connected by the leads s, s through the rectifying contactor C and the load L. Shunted across and valving in the same (here left to right) direction as the contactor C is the auxiliary rectifier R, connected by the leads x, x. If the conduction of the auxiliary rectification is vaporous, it may be that which is performed by the spark-vaporization of the liquid mercury at the end of each conductive period in some one of my improved vibratory contactors already described. For simplicity, reliability and general superiority this is the preferred auxiliary operation; but the auxiliary function could be performed at less advantage by a separate vapor rectifier connected across the rectifying contacts. I have also operated my contact rectifier or contactor with a junction rectifier connected and serving as the auxiliary R.

The junction type of rectifier is a suitable kind to serve as this auxiliary, particularly in low-voltage, heavy-current contactor operation. By junction rectifier is meant the type operative because of asymmetric conductance to reversing voltage, at the interface between differing solid elements or compounds. Examples are the copper-copper-oxide type, the selenium form, and the magnesium-copper-sulphide rectifier.

Being a device of low forward resistance, the junction rectifier is conductive of small or even fairly large residues of current at the beginning and end of the major conduction in each working cycle of the contactor, and at the small fractions of maximum voltage that are remnant in the brief time intervals concerned. The product of the short fractions of time into the small or moderate momentary currents is equal to still smaller integrated current effective in continuous loading of the auxiliary rectifier. Hence the rating of the latter need be only a minor fraction of the volt-ampere capacity of the contactor served thereby.

In Fig. 31 is illustrated a preferred method of polyphase conversion employing vibratory contacting according to my invention. Here each of the three single-phase transformers T, through lead p is served on its primary side by the three-phase power source G and is connected to the primary neutral o'. On the secondary side, each transformer at its right-hand end is connected to the secondary neutral o''. This gives a three-phase system to be rectified. The other end of each transformer secondary, by a lead s is connected with the outer terminal of one of the three contactors C, C, C. The other terminals of the three contactors are connected to the contactor neutral oc, from which direct-current power cables d, d lead through the working load L to the transformer secondary neutral o''. The three auxiliary rectifiers R, R, R, have the same significance as already explained for Fig. 30.

Externally to the contactors, this connection system is similar to one of those employed in polyphase conversion with mercury-vapor rectifiers, and is given as an example. Internally however, the power currents are carried through my contactors in the low-resistance media of solid and liquid metals during the greater part of the conductive cycles of rectification, and through mercury vapor during only the final, brief, arcing portion of each cyclic conduction.

Stated otherwise, my improved process may be considered one of mercury-vapor rectification that is shunted during most of each conductive period by a low-resistance, non-vaporous metallic path. In this conduction the mobile metal performs two vital functions: During liquid conduction it greatly lowers the resistance from one solid contact to another, and as vapor it completes the rectifying cycle. This completion of the cycle includes the peculiar power and action of the cathode spot on liquid metal such as mercury, to preclude the reversal of the current by the spot's remaining extinguished after current zero until reestablished in the next cycle. The liquid contact should, of course, be ended slightly before the rectified current reaches zero, leaving the completion of the conduction to the spark-formed vapor as stated.

In Fig. 32 is diagrammed a modification of my method of conversion employing vibratory contacting, that permits adjustment of the output voltage of conversion. Here as in Fig. 31 the vibratory contactors C, C are connected by the leads s, s to the secondary terminals of the transformers T, T, T. The primary connections are the same as in Fig. 31, with the supply neutral omitted. The secondary is a six-phase or double three-phase system. By the lead d, the star-point oc of the contactors is again connected through the load L to the transformer secondary neutral o''. The actuative element of each contactor C is diagrammed as the coil A; and one end of each of these coils is connected to the actuator neutral oa, which is here diagrammed as a ring in order to clear the contactor neutral oc. The other ends of the actuative coils A are connected by the leads a, a to the output terminals b, b of the actuative phase adjuster P, now to be explained.

The phase adjuster P is a polyphase transformer built as an ordinary direct-current armature M with the usual segmental commutator K, with a number of brushes B, B equal to the number of phases of current required by the actuators A (in the example, six), and with two armature windings in the same slots. One of these windings Wa is connected in the usual manner to the commutator segments, and serves as the secondary supplying the actuators A through the brushes B and leads a. The other winding Wp, usually of a different voltage rating, is polyphase-connected by the leads j, j, j to the primary side of the power transformers T. The entire apparatus P is stationary, but the brushes B are angularly adjustable with respect to the commutator K and armature M. The ferromagnetic teeth of this armature project slightly above the winding in the slots; and fixed to the periphery of the armature with thin intervening insulation is a flux-return ring (not shown), of laminated transformer steel.

If the brushes B are set upon the segments of the commutator K at certain fixed points k, equally spaced and corresponding to the input points of the primary winding Wp, the voltages at the terminals b will be in phase with the primary voltages of the transformers T. If however, the brushes B are shifted from points k, terminals b will receive alternating voltages of the same magnitude as theretofore, but at a time phase altered proportionally to the amount of the shift. If the shift of the brushes is in the same direction as the rotation of flux polarity in the armature A, the voltages at the terminals b will be of later phase than at the supply points k. Preferably the winding of armature A is bipolar, and in that case the electric phase change is equal to the geometric shift of the brushes.

While in general the output voltages of the phase adjuster P are required to be symmetrically spaced, there may be a condition where it is desirable that some of these voltages be unequally phased from their neighbors, as in case the lag of responsive movement in one contactor C differs somewhat from that in another—each of course in relation to its own actuative impulse. This condition can be readily met, by setting the corresponding brush B of adjuster P to the right or left of its normal position of symmetrical spacing among the other brushes, to the required number of segment pitches. It is desirable that during adjustment all of the brushes pass from one position to another in definite steps each equal to the pitch of one commutator segment. Suitable mechanism can be provided to this end, such as a small roller resiliently engaging a notched cam fixed to and concentric with the brush-supporting rig.

In Fig. 33 is presented by diagram the effect upon the output voltage in a polyphase rectification, of performance of the actuative phase shifting just described. Here the transformer secondary voltages are shown as sinusoids, and the contactor-conductive portions of these waves in heavy lines. The resultant voltage for the load circuit oc—d—L—d—o'' of Fig. 32 is derived by following a set of the heavy lines from one part-wave to another as the output is commutated by the contactors from one transformer phase to the next. Three-phase commutation is shown for simplicity, and each phase of voltage is effective for one third of the time or 120°. However, the known double three-phase operation corresponding to Fig. 32 with single-phase transformers, or series or multiple commutation (as here) with any number of phases can be voltage-controlled by this method. In series commutation, the effect of the actuative phase shifting is similar to that of shifting the brushes of a direct-current dynamo.

In the upper section of Fig. 33, marked "No shift," the full effective unidirectional voltage is realized; since here the highest average of the ordinates under the heavy-line curve is found. In the next section, the contacting lags the transformer voltage by 30°; and the direct-current voltage (properly average rather than root-mean-square) is reduced to 86.6% of the full value. At 60° lag as shown, the area of the waves above zero is further reduced, small areas appear below zero, and the net D. C. voltage is 50% of the full value. At 90° shift the negative areas are equal to the positive, and the D. C. voltage becomes zero. These percentage values are the cosines of the shifts.

For clarity the curves in Fig. 33 are given without the small overlaps of conduction practiced in polyphase rectification. I have found by calculation and operation that within proper (and easily attained) tolerances of variation of these overlaps, my phase-adjustive method of control can be practiced to give the range from 100% down nearly to zero voltage, at full ampere load, with only moderate sparking at the contacts. Provided the leakage self-inductance of transformers T be low, the energy of such sparking will represent small reduction in the over-all efficiency of the conversion, and small and tolerable heating of the contactors.

Instead of providing the armature M of the phase adjuster P with two windings it may have a single winding Wa, connected to the commutator K as before. The supply leads j are brought directly to the commutator at the fixed points k. The apparatus then functions as an auto-transformer, but otherwise the same as the two-winding armature-type transformer. This construction is somewhat lighter and cheaper, but the structural saving is made at the sacrifice of rather important advantages possessed by the other form. That is to say, the two-winding transformer may serve the actuators at a voltage quite different from that of its own supply. Secondly, if supplied from the primary rather than the secondary side of the transformers T, the adjustive transformer P will keep the neutral of the actuative voltages quite fixed, and the actuative currents correspondingly uniform. If a single-wound or autotransforming adjuster P be supplied from the primary of transformers T, the actuative coils A will be operated at primary voltage, and this might be inconvenient in the insulative design of the contactors.

While I have not illustrated electrical circuits of a system in connection with certain of the contacting means illustrated above, it is understood that such circuits are implicit in the above description. For example, the contacting means shown in the different modifications above, Figs. 1 to 5, 6–7, 9 to 11, 12 to 15, 16 to 18, 19–20, 23–24, and 25 inclusive, when employed as vibratory contacting means, may be used in the systems illustrated in Figs. 30, 31 and 32 as the means C, R there shown, and with the advantages above described.

Within the scope of my invention, many variations of design and operation may be exploited. This is exemplified by the several forms of actuative and contactive elements and their combinations herein presented, and by the several types of complete converters. Accordingly, I wish to be limited not to the exact disclosure set forth, but rather to the true scope of my invention in relation to the prior art, as delimited by the following claims.

I claim:

1. A system for transferring power between two electric circuits in at least one of which the current is unidirectional, comprising transforming means combined with a plurality of vibratory contactors, each contactor being unitary and enclosed within a sealed cell, the said contactor having at least one movable contact body of solid conductor, tuned elastic means supporting upon the body of the cell a movable contact means, and means relieving the said supporting means of major electric conduction.

2. A system for transferring power between two electric circuits in at least one of which the current is unidirectional, comprising transforming means combined with a plurality of vibratory contactors each contactor being unitary and enclosed within a sealed cell, the said contactor having at least one movable contact body of solid conductor, tuned elastic means supporting upon the body of the cell a movable contact means, and means relieving the said supporting means of major electric conduction, the sealed cell being filled with contact-protective gas.

3. The method of commutation in electric machines by vibratory contacting with unitary contactors which comprises actuating the contactors electromagnetically and individually and shifting the phase of actuation of the vibratory contactors, thereby altering the commutated voltage, the shifting of the phase of actuation being performed by supplying for said actuation alternating currents that are modified through polyphase transforming, and by adjusting the phase interrelations of input to output conduction in said transforming.

4. A system comprising electromotive means combined with at least one vibratory contactor formed of a sealed cell and electric and magnetic structures internal and external thereto; the said electric structure including external terminals and internal coactive contact means comprising at least one member having a contact surface of liquid metal, at least one movable contact body of solid conductor, movable means supporting the movable contact means, and means relieving the said supporting means of major electric conduction; and the said magnetic structure including internal, magnetically actuable contact-motive means, external electromagnetic means adapted to actuate the said contact-motive means with variable flux at the frequency of operation of the said electromotive means, and means polarizing the magnetic system.

5. A system comprising electromotive means combined with at least one vibratory contactor formed of a sealed cell and electric, magnetic and elastic structures conjoined thereto; the said electric structure including external terminals and internal coactive contact means comprising at least one member having a contact surface of liquid metal, at least one movable contact body of solid conductor, movable means supporting the movable contact means, and means relieving the elastic structure of major electric conduction; the said magnetic structure including internal, magnetically actuable contact motive means, external electromagnetic means adapted to actuate the said contact-motive means with variable flux at the frequency of operation of said electromotive means, and means polarizing the magnetic structure; and the elastic structure including means disposed to return the movable internal parts to a position of rest.

6. Contacting means comprising a sealed cell and electric and magnetic structures internal and external thereto; the electric structure including external terminals and internal coactive contact means comprising at least one member having a contact surface of yieldable form, at least one movable contact body of solid conductor, movable means supporting upon the body of the cell the movable contact means, and means relieving the said supporting means of major electric conduction; and the magnetic structure including internal, magnetically actuable contact-motive means, external electromagnetic means adapted to actuate the said contact-motive means with variable flux, and means polarizing the magnetic structure.

7. Contacting means comprising a sealed cell and electric and magnetic structures internal and external thereto; the electric structure including external terminals and internal co-active contact means comprising at least one member having a contact surface of yieldable form and at least one movable contact body of solid conductor, movable means supporting upon the body of the cell the movable contact means, and means relieving the said supporting means of major electric conduction; and said magnetic structure including internal magnetically actuable contact-motive means and external electromagnetic means for actuating said contact-motive means with variable flux.

8. Contacting means comprising a sealed cell and electric and magnetic structures internal and external thereto; the electric structure including external terminals and internal coactive contact means comprising at least one member having a contact surface of liquid metal, at least one movable contact body of solid conductor, movable means supporting the movable contact means, and means relieving the said supporting means of major electric conduction; and the magnetic structure including internal, magnetically actuable contact-motive means, external electromagnetic means adapted to actuate the said contact-motive means with variable flux, and means polarizing the magnetic structure.

9. Contacting means comprising a sealed cell and electric, magnetic and elastic structures conjoined thereto; the electric structure including external terminals and internal coactive contact means comprising at least one member having a contact surface of yieldable form, at least one movable contact body of solid conductor, movable means supporting the movable contact means, and means relieving the elastic structure of major electric conduction; the magnetic structure including internal, magnetically actuable contact-motive means, external electromagnetic means adapted to actuate the said contact-motive means with variable flux, and means polarizing the magnetic structure; and the elastic structure including an element disposed to return the movable internal parts to a position of rest.

10. Vibratory contacting means comprising a sealed cell and electric, magnetic and elastic structures conjoined thereto; the electric structure including an annular, median terminal through the body of the cell, internal sliding means connective from this terminal to at least one movable contact pin of refractory metal, a pool of liquid metal coactive therewith, stilling means in said pool, and a second terminal connective with the pool through the floor of the cell; the magnetic structure including an internal, ferromagnetic, helical spring supporting the movable, solid electric elements and adapted to be self-compressive by mutual attraction of its turns when axially magnetized, together with polarizing means and a coaxial, external electromagnetic coil excited by alternating current at a desired frequency of contacting; and the elastic structure comprising the said helical spring, of such stiffness as to tune the movable system to a natural periodicity close to the said exciting frequency.

11. Contacting means comprising a sealed cell and electric and magnetic structures internal and external thereto; the electric structure including external terminals and internal coactive contact means comprising at least one member having a contact surface of yieldable form, at least one movable contact body of solid conductor, movable means supporting upon the body of the cell the movable contact means, and means relieving the said supporting means of major electric conduction; and the magnetic structure including internal, magnetically actuable contact-motive means, external electromagnetic means adapted to actuate the said contact-motive means with variable flux, and means polarizing the magnetic structure, the cell being filled with gas protective of the contact means.

12. Contacting means comprising a sealed cell and electric and magnetic structures internal and external thereto; the electric structure including external terminals and internal coactive contact means comprising at least one member having a contact surface of yieldable form, at least one movable contact body of solid conductor, movable means supporting upon the body of the cell the movable contact means, and means relieving the said supporting means of major electric conduction; and the magnetic structure including internal, magnetically actuable contact-motive means, external electromagnetic means adapted to actuate the said contact-motive means with variable flux, means polarizing the magnetic structure, and means for adjusting the idle positions of the movable parts relative to the stationary parts.

13. Contacting means comprising a sealed cell and electric and magnetic structures internal and external thereto; the electric structure including external terminals and internal coactive contact means comprising at least one member having a contact surface of liquid metal, at least one movable contact body of solid conductor, movable means supporting the movable contact means, and means relieving the said supporting means of major electric conduction; and the magnetic structure including internal, magnetically actuable contact-motive means, external electromagnetic means adapted to actuate the said contact-motive means with variable flux, means polarizing the magnetic structure, means for circulating the liquid metal and means for maintaining its working level at a substantially constant height.

14. Contacting means comprising a sealed cell and electric and magnetic structures internal and external thereto; the electric structure including external terminals and internal coactive contact means comprising at least one member having a contact surface of liquid metal, at least one movable contact body of solid conductor, movable means supporting the movable contact means, and means relieving the said supporting means of major electric conduction; and the magnetic structure including internal, magnetically actuable contact-motive means, external electromagnetic means adapted to actuate the said contact-motive means with variable flux, and means polarizing the magnetic structure, movable solid bodies being adapted to make shearing electric contact, through intervening liquid metal, with stationary bodies that present faces adjacent the planes of travel of faces of the movable bodies.

15. Contacting means comprising a sealed cell and electric and magnetic structures internal and external thereto; the electric structure including external terminals and internal coactive contact means comprising at least one member having a contact surface of liquid metal, at least one movable contact body of solid conductor, movable means supporting the movable contact means, and means relieving the said supporting means of major electric conduction; and the magnetic structure including internal, magnetically actuable contact-motive means, external electromagnetic means adapted to actuate the said contact-motive means with variable flux, and means polarizing the magnetic structure, means being provided to still the level of pooled liquid metal against excessive disturbance from impact of the movable solid contact means.

16. Contacting means comprising a sealed cell and electric and magnetic structures internal and external thereto; the electric structure including external terminals and internal coactive contact means comprising at least one member having a contact surface of liquid metal, at least one movable contact body of solid conductor, movable means supporting the movable contact means, and means relieving the said supporting means of major electric conduction; and the magnetic structure including internal, magnetically actuable contact-motive means, external electromagnetic means adapted to actuate the said contact-motive means with variable flux, and means polarizing the magnetic structure, the liquid metal being contained in plural pools that are insulatively separated.

17. Contacting means comprising a sealed cell and electric and magnetic structures internal and external thereto; the electric structure including external terminals and internal coactive contact means comprising at least one member having a contact surface of liquid metal, at least one movable contact body of solid conductor, movable means supporting the movable contact means, and means relieving the said supporting means of major electric conduction; and the magnetic structure including internal, magnetically actuable contact-motive means, external electromagnetic means adapted to actuate the said contact-motive means with variable flux, and means polarizing the magnetic structure, the liquid metal comprising an insulated single body connected with an electric terminal external to the cell, and the movable solid body being connected with a second electric terminal external to the cell.

18. Contacting means comprising a sealed cell and electric and magnetic structures internal and external thereto; the electric structure including external terminals and internal coactive contact means comprising at least one member having a contact surface of liquid metal, at least one movable contact body of solid conductor, movable means supporting the movable contact means, and means relieving the said supporting means of major electric conduction; and the magnetic structure including internal, magnetically actuable contact-motive means, external electromagnetic means adapted to actuate the said contact-motive means with variable flux, and means polarizing the magnetic structure, the liquid metal comprising an insulated single body connected with an electric terminal external to the cell, and the movable solid body being connected by mutually sliding conductors to a second electric terminal external to the cell.

19. Contacting means comprising a sealed cell and electric and magnetic structures internal and external thereto; the electric structure including external terminals and internal coactive contact means comprising at least one member having a contact surface of yieldable form, at least one movable contact body of solid conductor, movable means supporting upon the body of the cell the movable contact means, and means relieving the said supporting means of major electric conduction; and the magnetic structure including internal, magnetically actuable contact-motive means, external electromagnetic means adapted to actuate the said contact-motive means with variable flux, and means polarizing the magnetic structure, the means polarizing the magnetic structure being a source adapted to superimpose thereon a unidirectional flux.

20. Contacting means comprising a sealed cell and electric and magnetic structures internal and external thereto; the electric structure including external terminals and internal coactive contact means comprising at least one member having a contact surface of yieldable form, at least one movable contact body of solid conductor, movable means supporting upon the body of the cell the movable contact means, and means relieving the said supporting means of major electric conduction; and the magnetic structure including internal, magnetically actuable contact-motive means, external electromagnetic means adapted to actuate the said contact-motive means with variable flux, and means polarizing the magnetic structure, the means polarizing the magnetic structure being a source of periodic, unidirectional current for the electromagnetic actuative means.

21. Contacting means comprising a sealed cell and electric and magnetic structures internal and external thereto; the electric structure including external terminals and internal coactive contact means comprising at least one member having a contact surface of yieldable form, at least one movable contact body of solid conductor, movable means supporting upon the body of the cell the movable contact means, and means relieving the said supporting means of major electric conduction; and the magnetic structure including internal, magnetically actuable contact-motive means, external electromagnetic means adapted to actuate the said contact-motive means with variable flux, and means polarizing the magnetic structure, the means polarizing the magnetic structure being a rectifier in electric circuit with the electromagnetic actuative means.

22. Contacting means comprising a sealed cell and electric, magnetic and elastic structures conjoined thereto; the electric structure including external terminals and internal coactive contact means comprising at least one member having a contact surface of yieldable form, at least one movable contact body of solid conductor, movable means supporting the movable contact means, and means relieving the elastic structure of major electric conduction; the magnetic structure including internal, magnetically actuable contact-motive means, external electromagnetic means adapted to actuate the said contact-motive means with variable flux, and means polarizing the magnetic structure; and the elastic structure including an element disposed to return the movable internal parts to a position of rest, the elastic element having such stiffness that it imparts to the movable system a natural vibratory frequency of a value required for a particular periodic operation.

23. Contacting means comprising a sealed cell and electric, magnetic and elastic structures conjoined thereto; the electric structure including external terminals and internal coactive contact means comprising at least one member having a contact surface of yieldable form, at least one movable contact body of solid conductor, movable means supporting the movable contact means, and means relieving the elastic structure of major electric conduction; the magnetic structure including internal, magnetically actuable contact-motive means, external electromagnetic means adapted to actuate the said contact-motive means with variable flux, and means polarizing the magnetic structure; and the elastic structure including an element disposed to return the movable internal parts to a position of rest, the contact-motive means and the elastic element being identical.

24. In a contactor having an enclosure of stationary and movable contacting elements, motive means comprising a magnetically actuable rotor within and an electro-magnetically actuative stator without the enclosure and substantially concentric with the rotor, and means including a bearing-supported shaft for transmitting motion from the rotor to the movable contacting elements.

25. In a contactor having an enclosure of stationary and movable contacting elements, motive means comprising a magnetically actuable rotor within and an electro-magnetically actuative stator without the enclosure and substantially concentric with the rotor, and means including a bearing-supported shaft for transmitting motion from the rotor to the movable contacting elements, including means for translating the motion of the rotor to reciprocative movement of the movable contacting elements.

26. Contacting means comprising a sealed cell and an electric structure internal and external thereto; the electric structure including external terminals and internal, relatively movable solid conductive bodies adapted to make shearing electric contact, through intervening liquid metal, with solid conductive bodies fixed to the cell and presenting flat faces adjacent the planes of travel of faces of the movable bodies; and the relative movement being actuated by gravity when the cell is tilted.

27. Contacting means comprising a closed cell and electric, magnetic and elastic structures conjoined thereto; the electric structure including a lower, external terminal, an internal, liquid-metal pool connected therewith, stilling means in the pool, multiple pins of refractory metal coactive to make contact by dipping into the pool, supporting means for said pins, and sliding means connective therefrom to a second terminal external to the cell; the magnetic structure including internal, ferromagnetically actuable means fastened to the said pin support and axially motive thereof, a coaxial electromagnetic coil, and external ferromagnetic parts adapted to lead into actuative relation with said internal actuable means the fluxes of the said coil and of external polarizing means; and the elastic structure including an internal, helical spring supporting the movable electric and magnetic parts.

28. Contacting means comprising a closed cell and electric, elastic and magnetic structures conjoined thereto; the electric structure including external terminals and internal, plural, lateral, stationary contacts having working surfaces of yieldable form, and plural movable contacts coactive therewith; the elastic structure including a reed of suitable stiffness supporting the movable contacts; and the magnetic structure including a portion of said reed as of ferromagnetic metal, and ferromagnetic armatures mounted thereon, external polarizing magnets, and at least one external, actuative, electromagnetic coil linked with the internal ferromagnetic parts but not with the external polarizing magnets.

29. Motive means comprising a ferromagnetic, mechanically compressible elastic body having in graphic section a succession of opposed faces, and means supplying magnetic flux from face to face therealong to cause mutual attraction among the faces and resultant compression of the elastic body.

30. Motive means comprising a ferromagnetic, mechanically compressible elastic body having in graphic section a succession of opposed faces, and means supplying magnetic flux from face to face therealong to cause mutual attraction among the faces and resultant compression of the elastic body, the magnetic flux supplied being polarized.

31. A system for transferring power between two electric circuits in at least one of which the current is unidirectional, comprising transforming means combined with a plurality of vibratory contactors, each contactor being unitary and enclosed within a sealed cell, the said contactor having at least one movable contact body of solid conductor, tuned elastic means supporting upon the body of the cell a movable contact means, a junction rectifier connected directly across the working gap of each of said contactors, and means relieving the said supporting means of major electric conduction.

GEORGE T. SOUTHGATE.